United States Patent [19]

Umezawa et al.

[11] Patent Number: 5,491,507
[45] Date of Patent: Feb. 13, 1996

[54] VIDEO TELEPHONE EQUIPMENT

[75] Inventors: Koichi Umezawa, Tokyo; Hiroyuki Kuriyama, Yokohama; Takanori Nishiyama, Mitaka; Kiyoshi Ishida, Yokohama; Iwao Ishinabe, Koganei, all of Japan

[73] Assignee: Hitachi, Ltd., Japan

[21] Appl. No.: 139,700

[22] Filed: Oct. 22, 1993

[30] Foreign Application Priority Data

Oct. 23, 1992 [JP] Japan ................... 4-286467

[51] Int. Cl.⁶ .................................. H04M 11/00
[52] U.S. Cl. .................. 348/14; 379/433; 379/58
[58] Field of Search .................. 379/433, 434, 379/93, 96–99, 90, 110, 58, 61; 455/89, 90; 348/14, 20; H04N 7/12, 7/14

[56] References Cited

U.S. PATENT DOCUMENTS

| D. 297,734 | 9/1988 | Soren et al. . | |
| D. 297,735 | 9/1988 | Soren et al. . | |
| 3,233,346 | 2/1966 | Cornberg | 348/14 |
| 4,796,288 | 1/1989 | Busche et al. | 379/433 |
| 5,151,946 | 9/1992 | Martensson | 379/433 |
| 5,177,784 | 1/1993 | Hu et al. | 379/433 |
| 5,280,524 | 1/1994 | Norris | 379/430 |

FOREIGN PATENT DOCUMENTS

| 0492748 | 7/1992 | European Pat. Off. | 379/433 |
| 2659514 | 9/1991 | France | 379/433 |
| 60-21636 | 2/1985 | Japan . | |
| 61-104653 | 7/1986 | Japan . | |
| 1-120159 | 5/1989 | Japan | 379/433 |
| 774750 | 8/1989 | Japan . | |
| 1-227555 | 9/1989 | Japan | 379/434 |
| 3-109891 | 5/1991 | Japan | H04N 7/14 |
| 3-162024 | 7/1991 | Japan | 455/89 |
| 4-117849 | 4/1992 | Japan . | |
| 8909524 | 10/1989 | WIPO | 379/433 |

*Primary Examiner*—Wing F. Chan
*Attorney, Agent, or Firm*—Evenson, McKeown, Edwards & Lenahan

[57] ABSTRACT

A handy type video telephone equipment which permits a user to transmit and receive pictures and speech with a casing held in one hand. A speaker is arranged at the upper end part of the front of the casing which is thin and vertically long, while a microphone is arranged at the lower end part thereof. A display panel and a control panel are interposed between the speaker and the microphone. A camera is mounted on the casing so as to be capable of altering its angle. The speaker is detachably mounted, and it is usable as an earphone when detached. The user's movements are not hampered during the transmission and reception, and the equipment can assume various communication or service attitudes conforming to the contents of information for the communications.

12 Claims, 23 Drawing Sheets

FIG.16(A)
FIG.16(B)
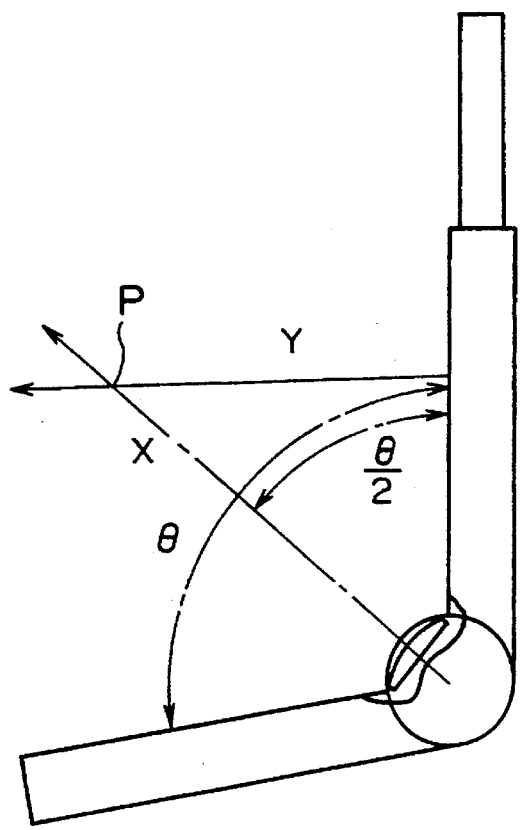
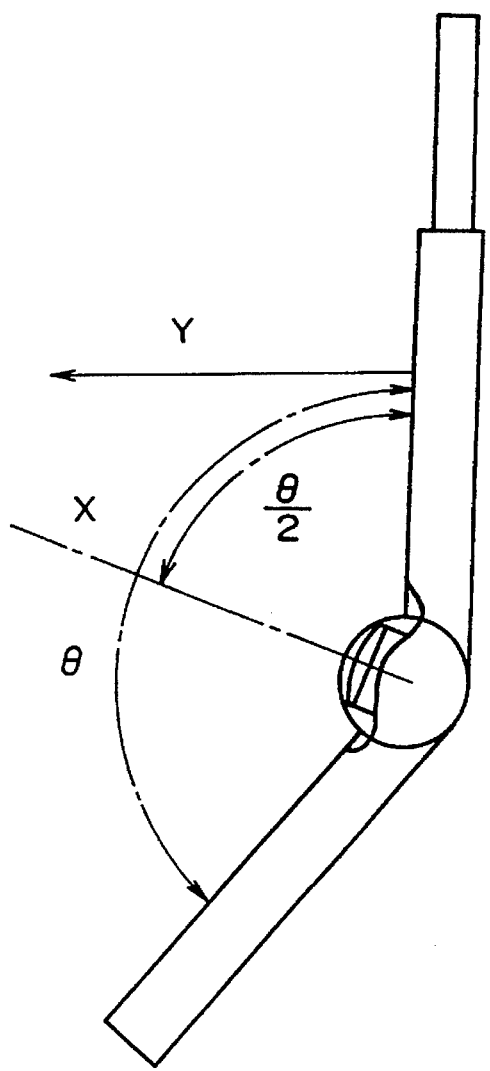

VIDEO TELEPHONE EQUIPMENT

BACKGROUND OF THE INVENTION

1. Field of the Invention

The present invention relates to video telephone equipment, and more particularly to a video telephone equipment of so-called handy type which permits a user to transmit and receive pictures and speech with its casing held in one hand.

2. Description of the Related Art

As a handy type video telephone equipment in the prior art, there has been proposed a video telephone set wherein a display panel, a control panel and a speaker are respectively arranged in the upper part, middle part and lowermost part of the front of the thin body of the telephone set as disclosed in Japanese Design Registration No. 774750.

Since the prior-art example is furnished with the display panel and the speaker, the user thereof can receive a picture and speech from the opposite party of a telephone conversation. This example, however, is chiefly intended for visual communication and does not sufficiently have the transmission and reception of speech only taken into account. Especially, no measure is taken for a case where the user does not want nearby persons to hear the voice of the opposite party. Further, in the prior-art example the body cannot stand by itself when it is at such an angle that the user can easily see the display panel, so that the use of the telephone set on a table is not considered. Besides, since the display panel, control panel and speaker are always exposed, countermeasures against external shocks, dust and malfunctions are not considered.

SUMMARY OF THE INVENTION

The present invention has been made in order to solve the drawbacks stated above, and has as its first object to provide a video telephone equipment which permits a user to transmit and receive pictures and speech with the casing thereof held in one hand.

The second object of the present invention is to provide a video telephone equipment which can assume both a vocal telephonic communication attitude corresponding to speech and a visual telephonic communication attitude corresponding to both a picture and speech, with the casing thereof held in one hand by a user, and which ensures good transmission and reception in each of the attitudes.

The third object of the present invention is to provide a video telephone equipment which can assume both a carried telephonic communication attitude with the casing thereof held in one hand by a user and an installed telephonic communication attitude with the whole equipment installed on a table or the like, and which ensures good transmission and reception in each of the attitudes.

The fourth object of the present invention is to provide a compact video telephone equipment which can transmit and receive pictures and speech with the casing thereof held in one hand by a user, and which can be favorably stored with the control panel and display panel thereof concealed.

In one aspect of performance of the present invention, there is provided a video telephone equipment, comprising signal processing means for permitting at least either of a vocal communication and a visual communication; a speaker which emits received speech for the vocal communication; a microphone which accepts speech to-be-transmitted for said vocal communication; a display panel which displays a received picture for the visual communication; a camera which takes a picture to-be-transmitted for the visual communication; a control panel through which a user of the video telephone equipment gives an operation command to the signal processing means; and a casing which is provided with the display panel, the speaker and the microphone; the display panel being arranged between the speaker and the microphone on the casing.

In this case, the video telephone equipment should preferably further comprise camera holding means for holding the camera in a snare in which an angular position thereof relative to the casing is alterable.

In the second aspect of performance of the present invention, there is provided a video telephone equipment, comprising signal processing means for permitting at least either of a vocal communication and a visual communication; a speaker which emits received speech for the vocal communication; a casing which is provided with the speaker; a microphone which accepts speech to-be-transmitted for the vocal communication; a display panel which displays a received picture for the visual communication; a camera which takes a picture to-be-transmitted for the visual communication; a control panel through which a user of the video telephone equipment gives an operation command to the signal the speaker in a state in which it is detachable from the casing.

In the third aspect of performance of the present invention, there is provided a video telephone equipment, comprising signal processing means for permitting at least either of a vocal communication and a visual communication; a speaker which emits received speech for the vocal communication; a microphone which accepts speech to-be-transmitted for the vocal communication; a display panel which displays a received picture for the visual communication; a camera which takes a picture to-be-transmitted for the visual communication; a control panel through which a user of the video telephone equipment gives an operation command to the signal processing means; a first casing in which the microphone is encased; a second casing in which the speaker is encased; and coupling means for coupling the first and second casings in a state in which angles thereof are alterable.

In this case, the angle of the first casing should preferably be alterable both frontwards and rearwards with respect to the angle thereof at which the first casing is even with the second casing.

Besides, the coupling means may well couple the first and second casings in a state in which the first casing is slidable perpendicularly to an axial direction of the coupling.

Further, the video telephone equipment should preferably comprise camera holding means for holding the camera adjacent to the first casing. The camera holding means may well hold the camera at coupled parts of the first and second casings.

The camera holding means should preferably include angle keeping means for bringing an optic axis of the camera into a direction of an angle of $\theta/2$ where $\theta$ denotes an angle which is defined at the coupled parts by the first and second casings.

It is preferable that, when the first and second casings are placed one over the other by altering the coupling angle, their surfaces which confront each other are substantially identical in shape and in area.

In the fourth aspect of performance of the present invention, there is provided a video telephone equipment, comprising signal processing means for permitting at least either of a vocal communication and a visual communication; a speaker which emits received speech for the vocal communication; a microphone which accepts speech to-be-transmitted for the vocal communication; a display panel which displays a received picture for the visual communication; a camera which takes a picture to-be-transmitted for the visual communication; a control panel through which a user of the video telephone equipment gives an operation command to the signal processing means; a first casing in which the microphone is encased; a second casing in which the speaker is encased; a third casing in which the display panel is encased; first coupling means for coupling the first and third casings; and second coupling means for coupling the second and third casings; at least the second one of the first and second coupling means being capable of altering an angle of the coupling thereof.

In this case, it is preferable that an angle of the first casing is alterable both frontwards and rearwards at a part thereof coupled by the second coupling means, with respect to an angle thereof at which the first casing is even with the third casing.

It is preferable that, when the first and third casings are placed one over the other by altering an angle of the coupling, their surfaces which confront each other are substantially identical in shape and in area.

The video telephone equipment should preferably further comprise a hood which intercepts external light entering the display panel; and hood fastening engagement means for fastening the hood in engagement with the second casing. The hood fastening engagement means should preferably fasten the hood in engagement in a state in which it is openably shut. In addition, the hood should preferably have a through hole extending between front and rear surfaces thereof.

The video telephone equipment should preferably further comprise camera holding means for holding the camera adjacent to the second casing.

In the video telephone equipment constructed as described above, the speaker and the microphone are so arranged that, when the former is held to the user's ear, the latter lies near his/her mouth. Besides, the display panel is arranged between the speaker and the microphone.

In this case, the body of the equipment for encasing the speaker, microphone and display panel therein may be configured of either the single casing or the plurality of casings. In the latter configuration, when the individual casings are coupled by hinges in order that the angles between the respectively adjacent casings may be alterable, the equipment can assume a variety of attitudes according to circumstances, such as a storage attitude for storing the equipment and a visual telephonic communication attitude for permitting both the vocal and visual communications.

By the way, since the movable camera is mounted on the casing, the user can transmit and receive pictures and speech with the casing held in one hand. Also, since the hood is comprised, the display panel can be prevented from being affected by the light falling thereon from outside the equipment. Besides, the speaker is detachably held, and it is usable in both the attached state and detached state thereof.

In accordance with the present invention, various effects are brought forth as stated below. Since the equipment can transmit and receive pictures and speech with the casing held in one hand, the user's movements are not hampered during transmission and reception. In addition, the equipment can assume, not only the visual communication attitude which corresponds to both the picture and speech and in which the casing is located in front of the user, but also a vocal communication attitude which corresponds to only speech and in which the speaker and the microphone are respectively located in the vicinities of the user's ear and mouth, so that the user can select the telephonic communication attitude which is suitable for the contents of the information of the telephone conversation. Yet in addition, the equipment can assume, not only a carried telephonic communication attitude in which the casing is held in one hand by the user, but also an installed telephonic communication attitude in which the casing Is installed on a table or the like, so that the user can select any of the multifarious telephonic communication attitudes. Besides, in the working or service state of the equipment, the full length thereof can be suited to the user's ear and mouth by exposing the control panel and the display panel, whereas in the stored state of the equipment, the full length thereof can be shortened with the control panel and the display panel being concealed, so that the storability and portability of the equipment are high. Further, since the speaker can be used in the detached state, the equipment exhibits a high versatility in use.

BRIEF DESCRIPTION OF THE DRAWINGS

FIGS. 16(A) and 16(B) are explanatory views showing the angular positions of the camera in the third embodiment in the state of a narrow open angle and in the state of a wide open angle, respectively;

PREFERRED EMBODIMENTS OF THE INVENTION

Now, the embodiments of handy type video telephone equipment according to the present invention will be described in detail with reference to FIGS. 1 thru 23.

FIG. 1 thru FIGS. 8(A)–8(C) illustrate the first embodiment of the handy type video telephone equipment according to the present invention.

Figure 1:
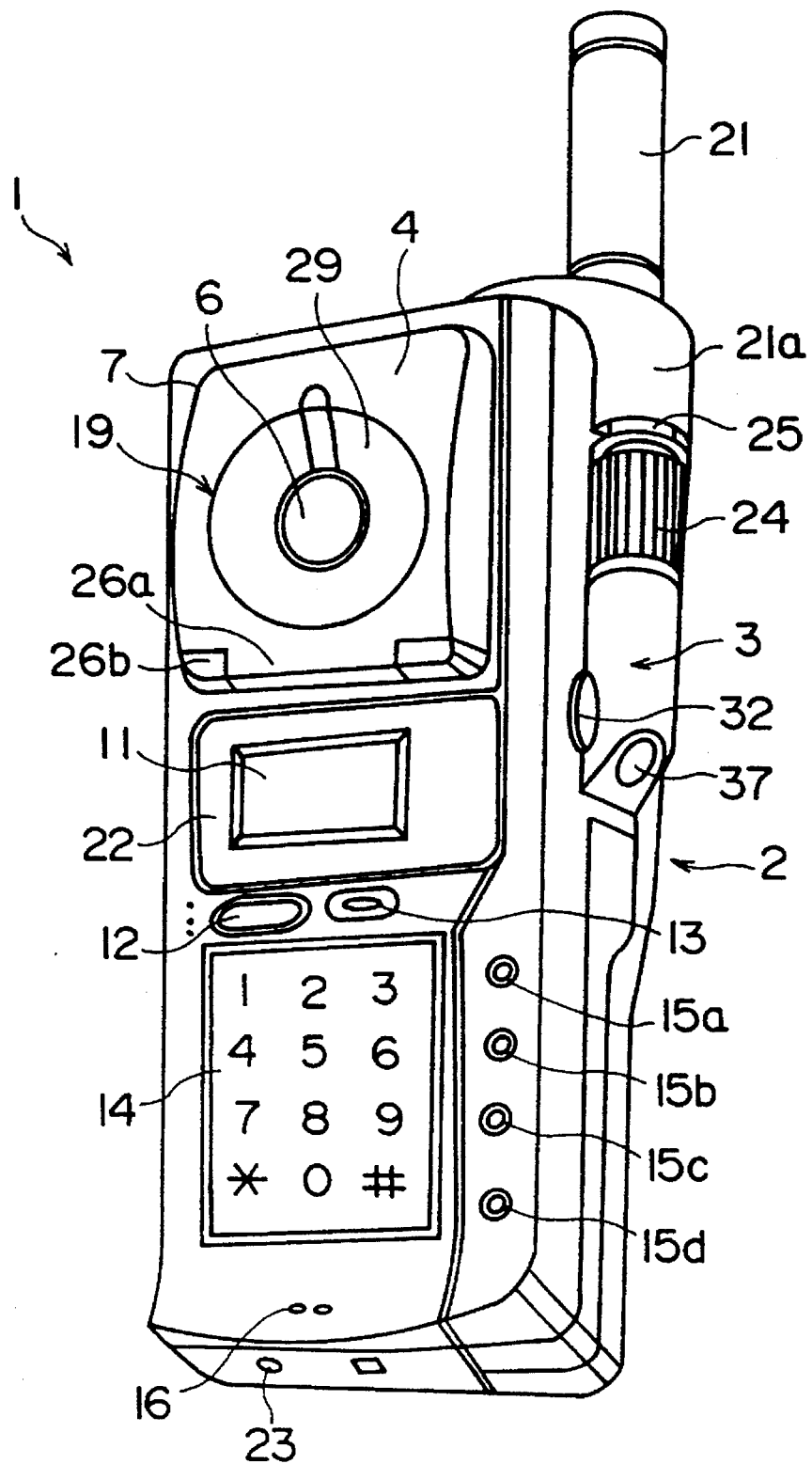
FIG. 1 is a front perspective view showing the vocal communication attitude of a video telephone equipment in the first embodiment of the present invention.
Figure 2:
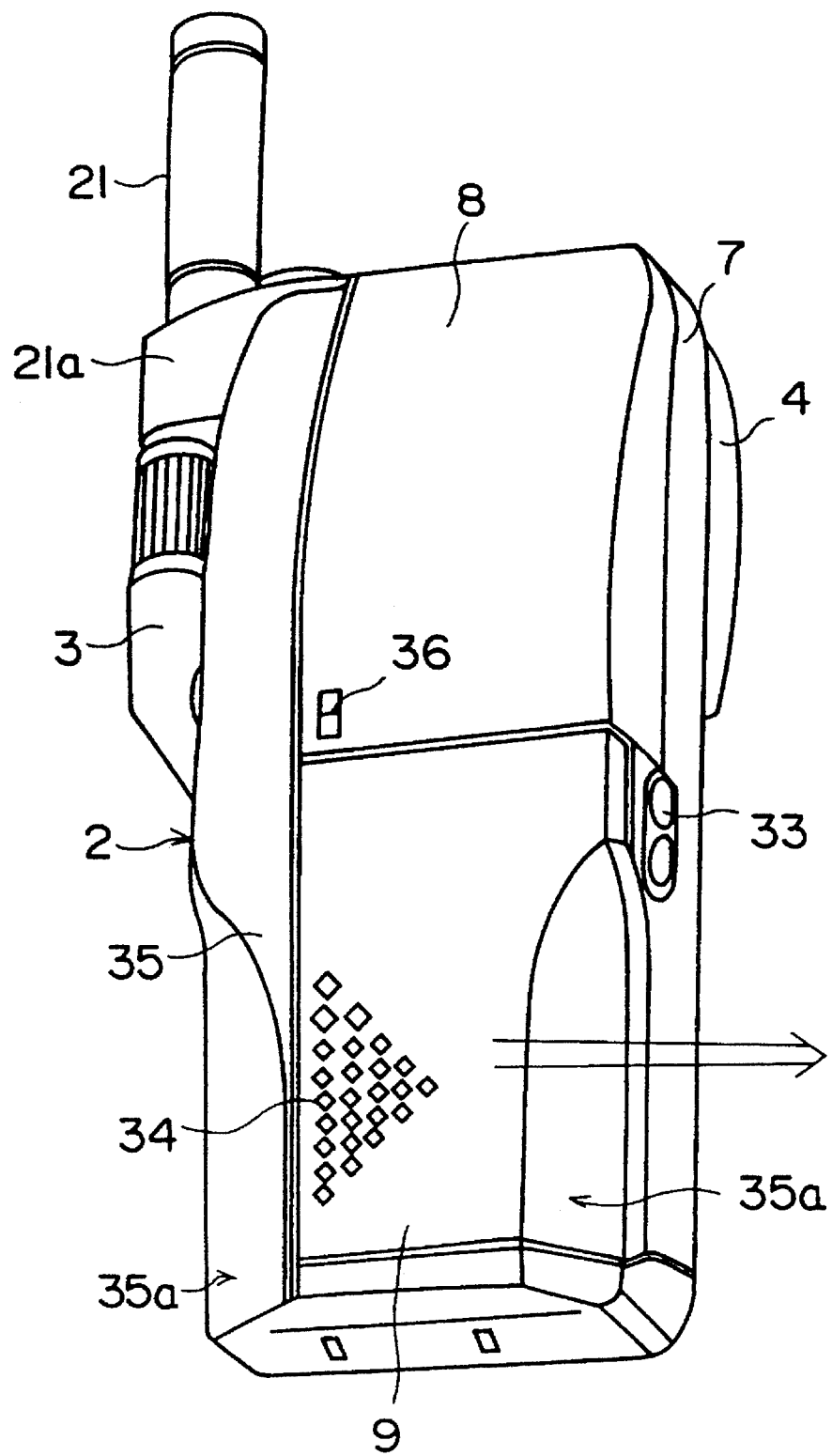
FIG. 2 is a rear perspective view showing the vocal communication attitude of the first embodiment of the present invention.

The exterior structure of this embodiment will be outlined with reference to FIGS. 1 and 2, which are front and rear perspective views of this embodiment, respectively. The handy type video telephone equipment generally indicated by numeral 1 is mainly constructed of the body 2 thereof which is thin and flat and which is in a vertically long shape, a camera 3 which is turnably mounted on the right side surface of the body 2, an ear pad 4 which is foldably mounted on the upper part of the front of the body 2, a speaker 6 which is arranged at the central part of the ear pad 4, an antenna 21 which is mounted on the right side of the top surface of the body 2, and a battery assembly 9 which is detachably mounted on the lower part of the rear surface of the body 2. In addition, a grip 35 (chamfered parts 35a) is formed extending from the rear surface of the handy type video telephone equipment 1 to both the side surfaces thereof.

A display panel 11, a transmission/reception key 12, a termination key 13, a control panel 14, function keys 15, and a microphone 16 are arranged on the front surface of the body 2, in addition to the ear pad 4.

Here, the schematic layout of functional modules inside the equipment 1 will be explained.

Figure 3:
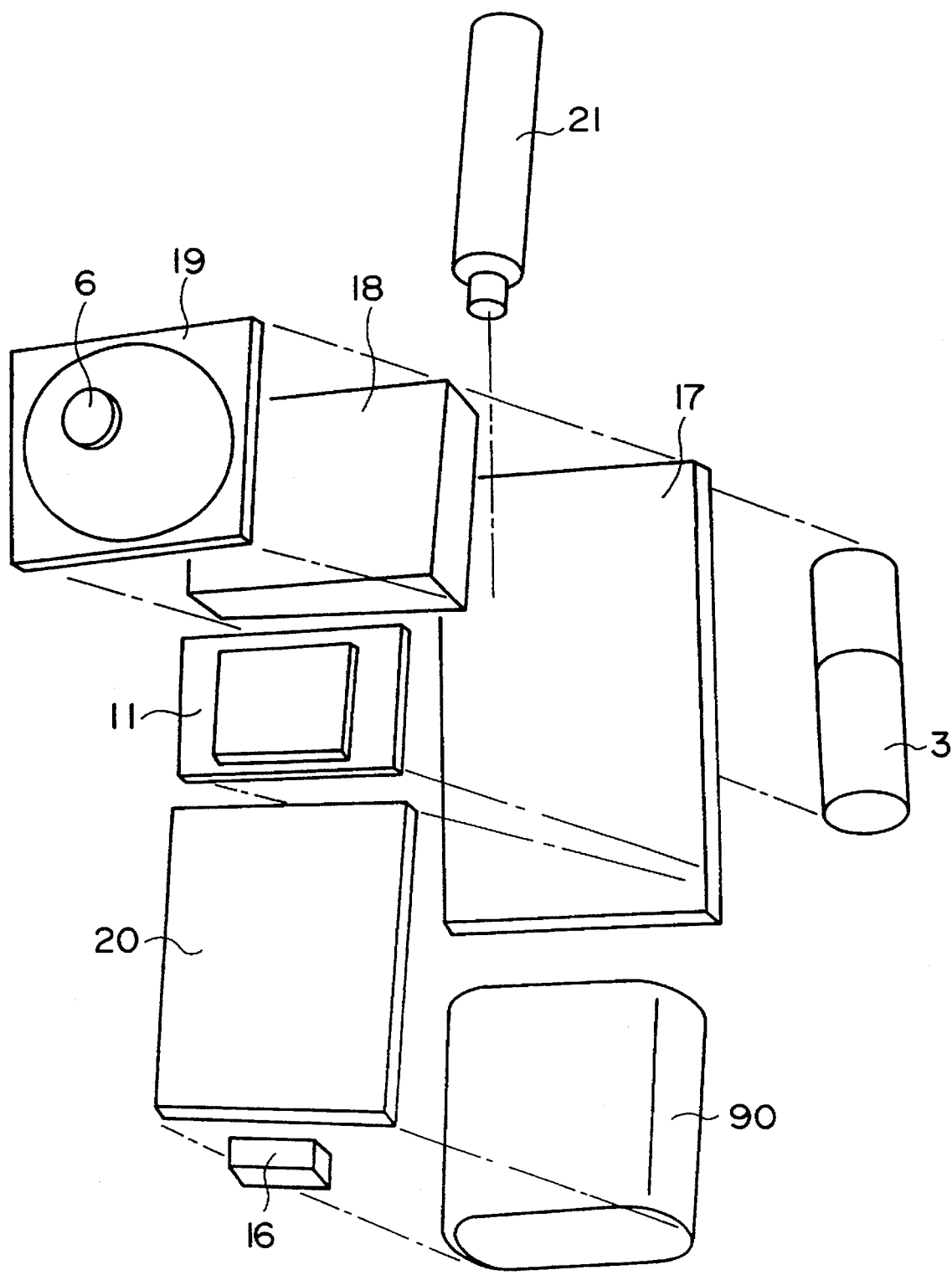
FIG. 3 is an exploded view showing the interior functional modules of the video telephone equipment.
Figure 4:
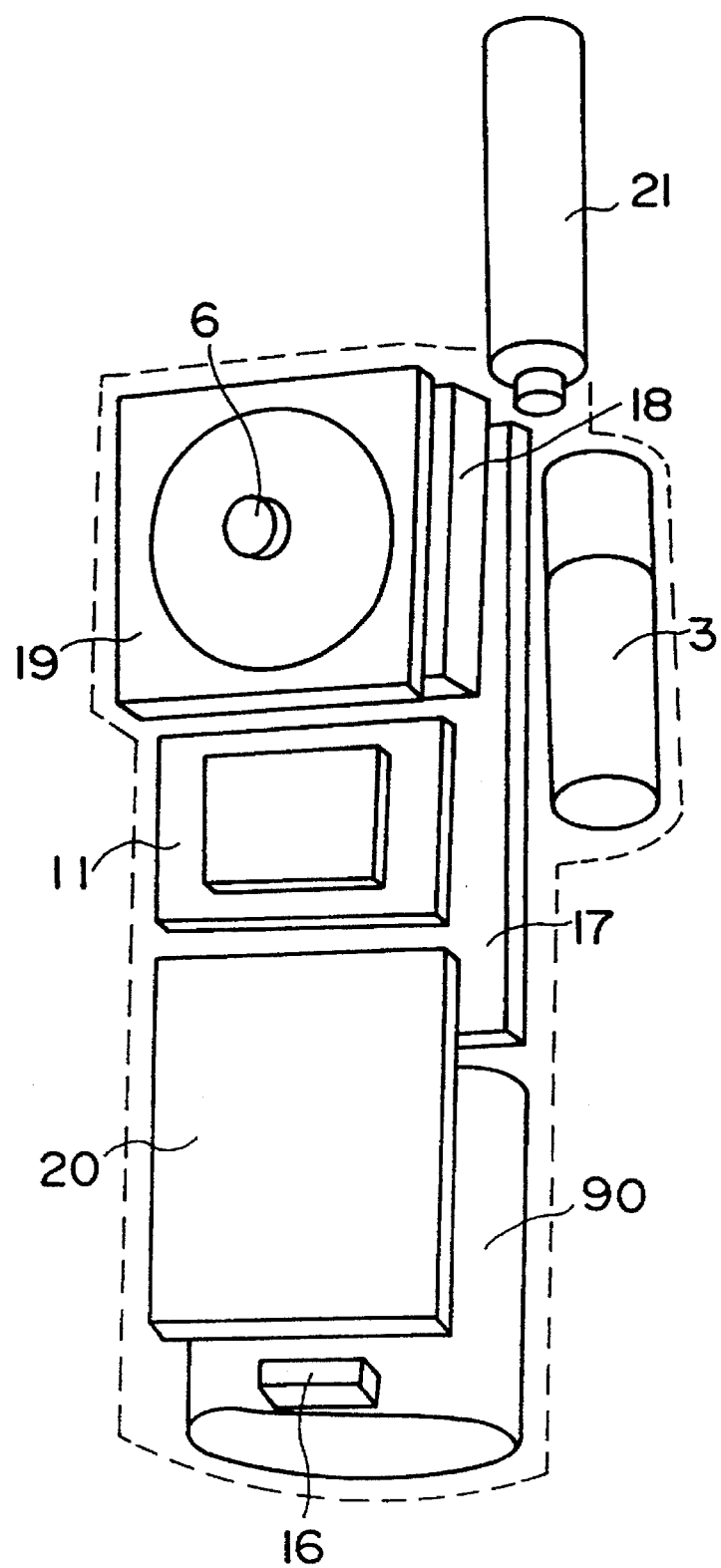
FIG. 4 is a schematic layout view of the interior functional modules.

FIG. 3 is an exploded view showing the functional modules, while FIG. 4 is a schematic layout view of the functional modules. The handy type video telephone equipment 1 is furnished with a main circuit board 17 which includes a processor and a memory, a communication device 18 which includes a radio/video coded, a cord reel 19, the speaker 6, the display panel 11 which is comprised of a liquid crystal, a control circuit board 20, the microphone 16, a battery 90 which constitutes the battery assembly 9, the antenna 21, and the camera 3.

The main circuit board 17 is arranged on the rear side of the upper part of the internal structure (shown in FIG. 4) inside the body 2. The communication device 18 and the display panel 11 are arranged in front of the main circuit board 17. The control circuit board 20 is arranged below the display panel 11, and the microphone 16 is below the control circuit board 20.

The battery 90 is located below the main circuit board 17. As shown in FIG. 2, the battery assembly 9 is detachably attached to a rear cover 8.

The antenna 21 is arranged obliquely above the communication device 18 on the right side thereof. This antenna 21 is mounted on a fixture 21a (refer to FIG. 1) which is formed on the right side of the upper part of a front cover 7.

The camera 3 is arranged on the right side of the main circuit board 17 and the communication device 18, and on the lower side of the antenna 21. This camera 3 is turnably mounted at the right outside position of the front cover 7 as seen from FIG. 1.

Figure 5:
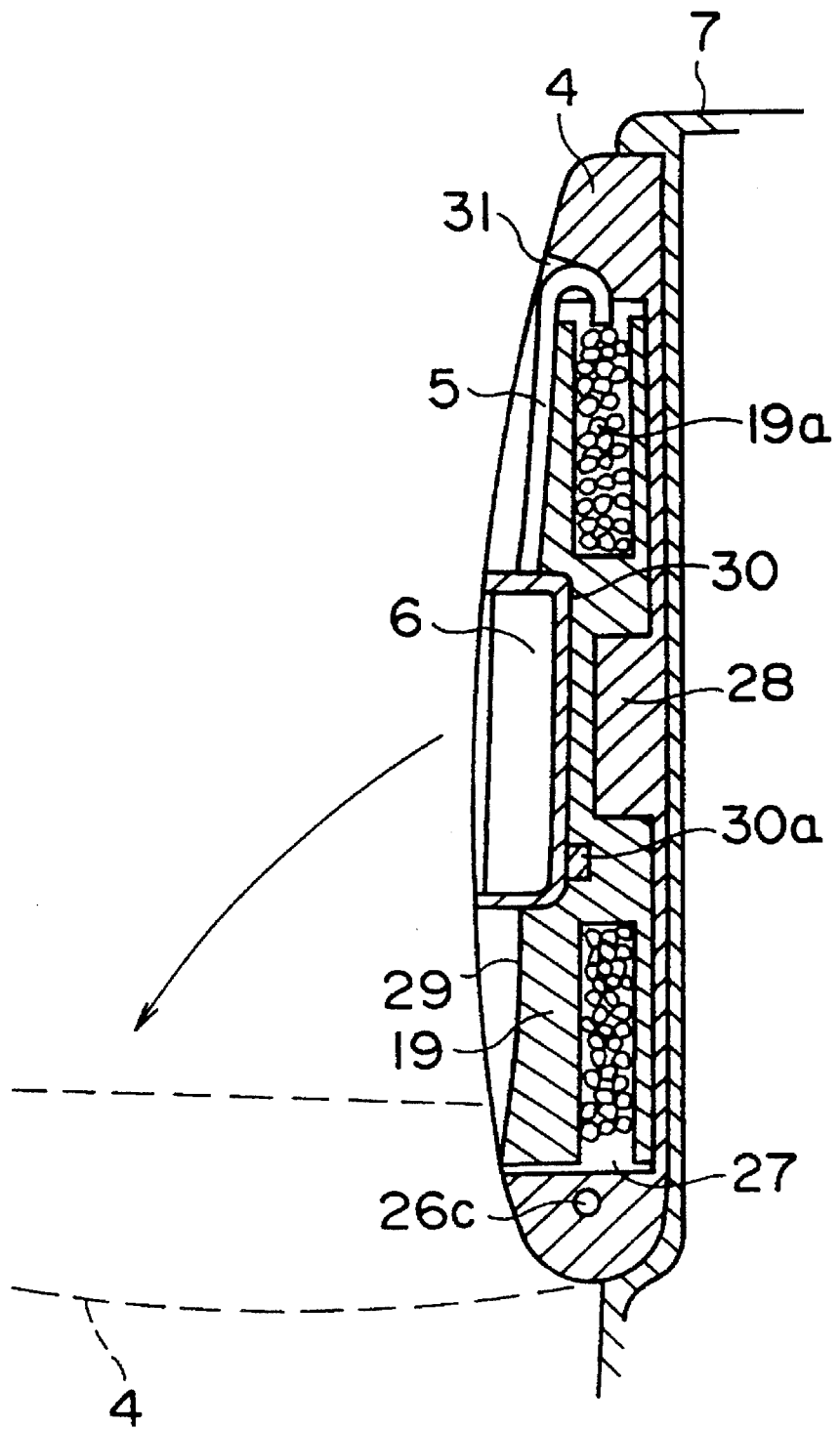
FIG. 5 is a partial sectional view showing an ear pad.

The cord reel 19 serves to take up a connection cord 5 (refer to FIG. 5) which transmits a signal to the speaker 6. As best shown in FIG. 5, the cord reel 19 is arranged in the state in which it is buried halfway in the ear pad 4. In this regard, the speaker 6 is detachably held on the rotary shaft 28 of the cord reel 19.

Next, the structures of the individual components will be explained in detail.

The body 2 is externally configured of the front cover 7 and the rear cover 8 as clearly shown in FIG. 2. Most of the components stated above are packaged between the front cover 7 and the rear cover 8. These covers 7 and 8 are joined through a rubber packing into a drip-proof structure. Besides, a receptacle 10 for receiving the ear pad 4 therein is provided in the front upper part of the front cover 7 (refer to FIG. 7).

As shown in FIG. 1, the ear pad 4 is formed with a lug 26a at the middle part of the lower end thereof, and the lug 26a is turnably or swingably coupled to a socket 26b which is formed in the front cover 7. Thus, the ear pad 4 is freely opened and shut with a fulcrum at the lower end thereof (exactly, at a pin 26c shown in FIG. 5). In the state in which the ear pad 4 is shut, the rear part thereof is received in the receptacle 10 and is made to feel unitary with the body 2. On the other hand, in the state in which the eat pad 4 is opened, it can be utilized as a hood which prevents external light from entering the display panel 11 disposed underneath. The opened state of the ear pad 4 is indicated at broken lines in FIG. 5.

As shown in FIG. 5, a concavity 27 centrally having the rotary shaft 28 is formed in the front surface of the ear pad 4. The cord reel 19 is fitted into the concavity 27, and is held so as to be rotatable about the rotary shaft 28. The front side of the cord reel 19 is exposed or uncovered. Thus, when the exposed part 29 is rotated by hand, the cord 5 can be taken up into a cord takeup space 19a. Besides, the exposed part 29 is in the shape of a mortar, and it is centrally formed with a recess in which the speaker 6 can be detachably received (hereinbelow, the recess shall be called the "speaker fixture 30"). By the way, the depth of the speaker fixture 30 is smaller than the thickness of the speaker 6. This is intended to facilitate the attachment and detachment of the speaker 6 owing to the fact that, even when the speaker 6 is received in the speaker fixture 30, the former is partially protruded in front of the latter. The construction of the ear pad 4 adapted to be openably shut, is intended to cause this ear pad 4 to function as the hood. Accordingly, when such a use as the hood is not considered, the ear pad 4 and the speaker 6 may well be fixedly arranged at the upper part of the front of the body 2.

In addition, the speaker fixture 30 is furnished with a detector switch 30a which detects whether or not the speaker 6 is attached. Thus, the attached or detached state of the speaker 6 is decided on the basis of a signal produced through the detector switch 30a, and the sound volume of the speaker 6 is automatically adjusted to an appropriate level corresponding to the state of use.

It is also possible for the speaker fixture 30 and the speaker 6 to be respectively provided with contacts, and for a voice signal to be input to the speaker 6 through the contacts without the intervention of the cord 5. In this case, the speaker 6 can be supplied with the voice signal through the contacts when it is attached to the speaker fixture 30, and through the cord 5 when it is used as an earphone. Alternatively, the speaker 6 can be rendered wireless. Incidentally, any drip-proof measure should also preferably be taken for the contacts.

In this manner, this embodiment is so constructed that the sound volume and tonal quality of the speaker 6 can be automatically altered in correspondence with the state of use thereof.

As shown in FIG. 5, the connection cord 5 of the speaker 6 is stored up in the cord takeup space 19a of the cord reel 19 via an inlet 31. Incidentally, the inlet 31 is formed by cutting away part of the marginal edge of the concavity 27.

In drawing out the speaker 6, the user of the equipment first pinches the speaker 6 and detaches it from the speaker fixture 30. Subsequently, he/she draws the speaker 6 toward him/her while pinching it. Then, the cord reel 19 is rotated, and the connection cord 5 is delivered out of the cord takeup space 19a. On the other hand, in setting up the speaker 6, the user rotates the exposed part 29 in the takeup direction of the cord reel 19 by hand, thereby taking up the connection cord 5 into the cord takeup space 19a. Lastly, he/she attaches the speaker 6 to the speaker fixture 30. Although, in this embodiment, the cord reel 19 is partially exposed outside the ear pad 4 in order to manually perform the operation of taking up the cord 5, it may well be entirely contained in the ear pad 4 or the body 2 by providing an automatic takeup mechanism which includes, for example, a torsion spring.

The camera 3 is endowed with an autofocusing function and an angle-of-view adjusting function (enlargement, telescopy). As best shown in FIG. 1, the camera 3 has one end side thereof coupled with a pivot 32 which is mounted on the right side surface of the body 2 with respect to the display panel 11 and which extends substantially perpendicularly to the side surface. Thus, the camera 3 is turnable frontwards and rearwards relative to the body 2. As indicated by dot-and-dash lines in FIG. 6, the turnable angles of the camera 3 are in a range of frontward 120° ~ rearward 120°. In addition, the pivot 32 is provided with radial ribs (not shown) at intervals of, for example, 5°, so that the camera 3 can be fixed at any desired angle (though stepwise). Besides, the view points of the display panel 11 and the camera 3 are brought into coincidence to the utmost. The reason therefor is that, unless the camera 3 photographs the front of the person speaking, namely, the user, then the photographed person does not face frontways in a picture displayed on the video telephone set of the opposite person of the telephonic communication, so an unnatural impression is given.

Figure 6:
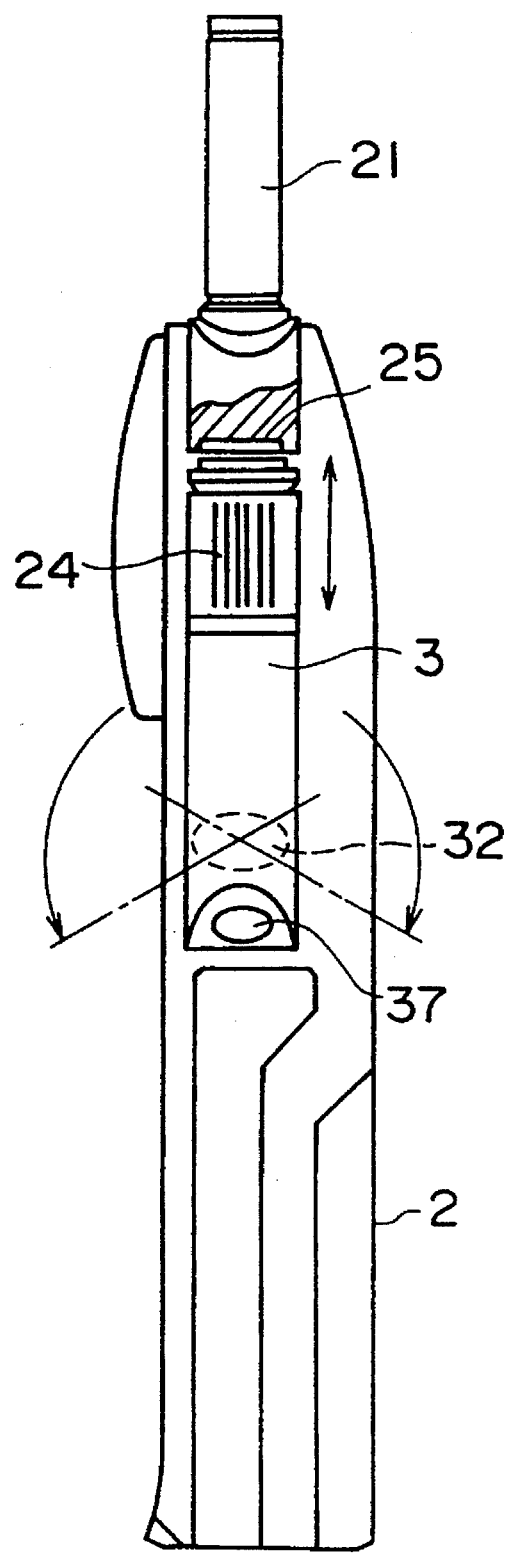
FIG. 6 is a right side view for explaining the turning operation of a camera.
Figure 7:
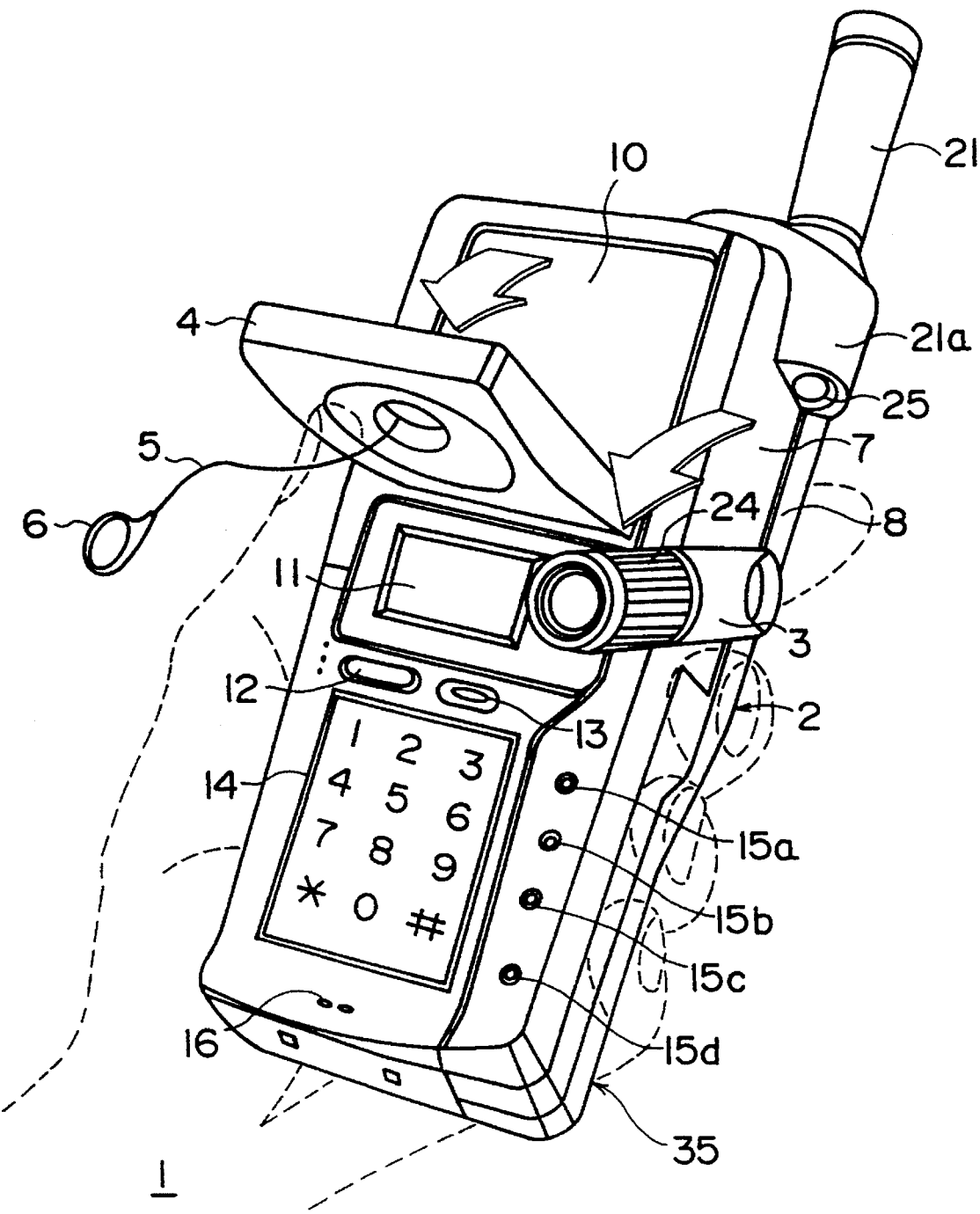
FIG. 7 is a perspective view showing the visual communication attitude of the first embodiment of the present invention.

As shown in FIG. 6, a lens portion 24 provided at the distal end of the camera 3 is slidable in the longitudinal direction of this camera 3 relative to the body thereof. On the other hand, an indent 25 into which the foremost end of the lens portion 24 can be snugly fitted is formed at the lower end of the fixture 21a of the antenna 21 (refer also to FIG. 1). In a case where the lens portion 24 is pulled up and is brought into engagement with the indent 25 in the state (shown in FIG. 6) in which the longitudinal direction of the camera 3 agrees with that of the telephone equipment 1, the camera 3 can be fixed into a storage state. In the storage state, the lens portion 24 can be protected from waterdrops and dust (refer to FIG. 6).

As shown in FIG. 1, a pause button 37 is provided at the rearmost end of the camera 3. When the pause button 37 is depressed under the telephone conversation based on the visual telephonic communication function of the equipment 1, the photographing operation of the camera 3 (or the transmission of a photographed picture) is temporarily stopped. Accordingly, when the pause mode is utilized in case of, for example, turning the camera 3 during the telephone conversation, an unwanted picture taken during the turning operation can be cut. In the case of suspending the photographing, the signal of a specified display picture (for example, a picture which is blue over the whole area thereof) may well be transmitted instead of the photographed picture.

The display panel 11 is covered with a semitransparent plate 22 (refer to FIG. 1). The semitransparent plate 22 serves for the protection of the display panel 11, and so forth. It is provided to be even with the front cover 7.

The control panel 14 in this embodiment is made of a liquid-crystal panel which is furnished with a touch panel, and which displays ten-keys and several operation keys within a rectangular compartment. The user can enter an input by fingering the operation key which corresponds to his/her designation. It is to be understood, however, that the control panel 14 is not restricted to the liquid-crystal panel.

As best shown in FIG. 1, the function keys 15 consist of a button 15a for changing-over the visual telephone function and vocal telephone function of the equipment 1, a button 15b for changing-over the picture frames of the control panel 14, and buttons 15c, 15d for scrolling the picture frame of the control panel 14.

The grip 35 (refer to FIG. 2) is constituted by, not only the rear surface of the body 2, but also the battery assembly 9. Since the grip 35 has the corners of both the sides of the lower part thereof chamfered as indicated by symbols 35a, it fits the user's hand, and it permits the user to firmly hold the handy type video telephone equipment 1 even in one hand.

A power source switch 33 disposed on the left side surface of the body 2 serves to bring the handy type video telephone equipment 1 into a standby state. Needless to say, a call can be accepted even in the standby state. By the way, in this embodiment, the power source switch 33 is arranged on the left side on the premise that the handy type video telephone equipment 1 is usually carried in the left hand. It is a matter of course, however, that this causes almost no problem even when the user uses the equipment 1 while carrying it in the right hand.

The battery assembly 9 can be detached when slid in the direction of a thick arrow indicated in FIG. 2. In addition, the surface of the battery assembly 9 is formed with a toughened portion 34, so that this battery assembly 9 is handled with ease in the attachment and detachment thereof. An unlocking switch 36 for the battery assembly 9 is disposed above this battery assembly 9 on the rear surface of the body 2. Further, charging terminals 23 (shown in FIG. 1) disposed on the bottom surface of the body 2 are connected with the terminals of a separate charging apparatus when the battery 90 (shown in FIGS. 3 and 4) of the battery assembly 9 is to be charged.

Figure 8A:
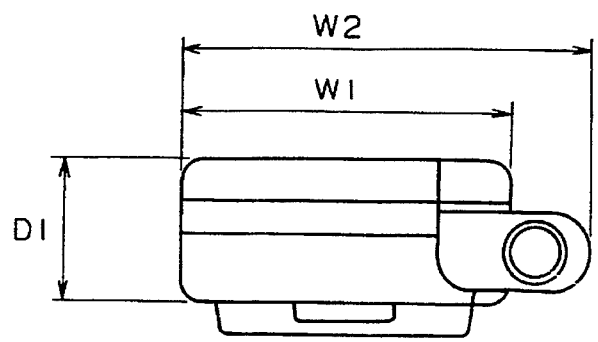
FIGS. 8(A), 8(B) and 8(C) are a top view, a side view and a front view, respectively showing the vocal communication attitude.
Figure 8B:
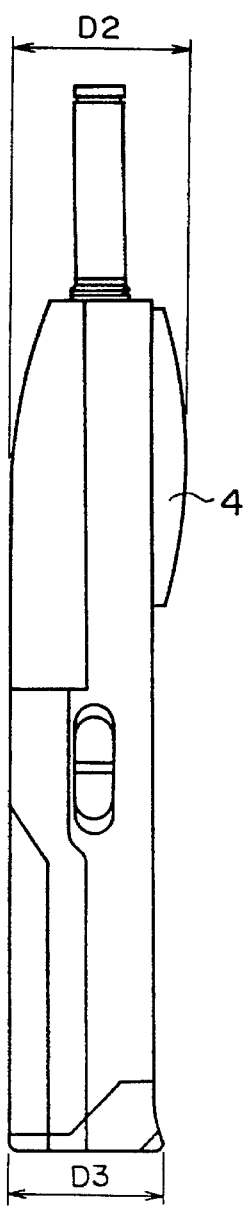
Figure 8C:
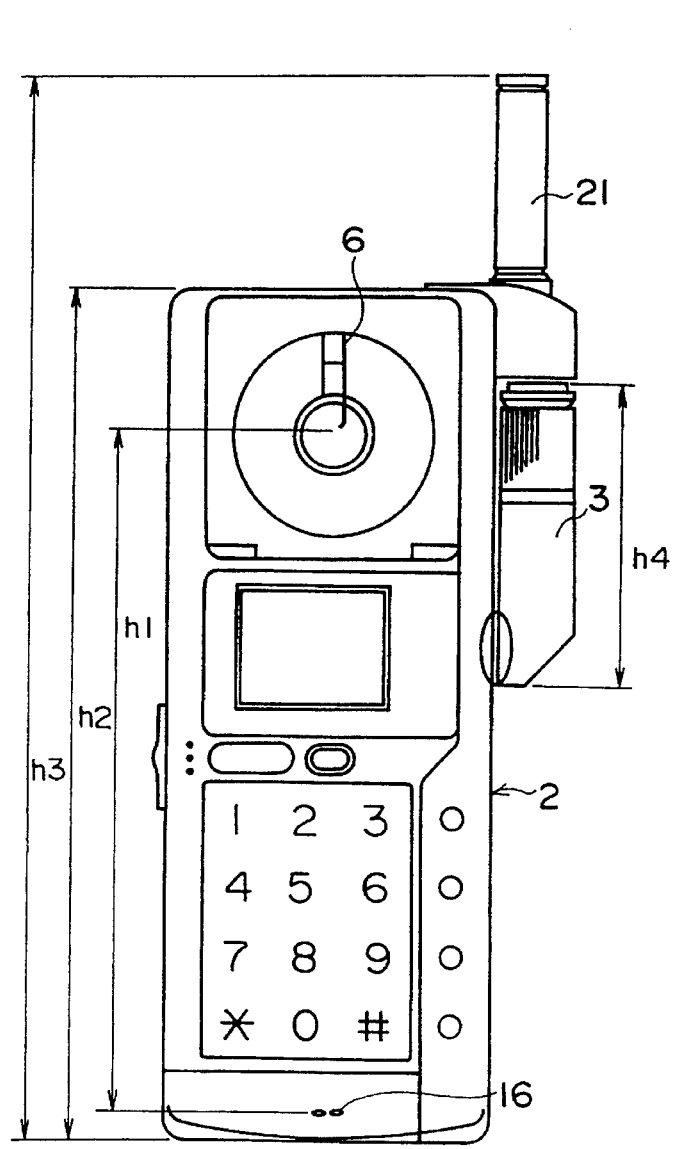

The dimensions of the handy type video telephone equipment 1 are as will now be explained in conjunction with FIGS. 8(A)–8(C). The height h2 of the body 2 is set at 164 [mm], the lateral width W1 thereof at 64 [mm], and the thickness D1 thereof at 29 [mm]. The height h3 of the equipment 1 including the antenna 21 is set at 205 [mm], and the lateral width W2 thereof at 80 [mm]. The distance h1 between the speaker 6 and the microphone 16 is set at 130 [mm], and the length h4 of the camera 3 at 59 [mm]. The thickness D2 of the equipment 1 including the ear pad 4 is set at 35 [mm], while the thickness D3 of the lower end of the body 2 is set at 30 [mm]. Besides, the camera 3 is in the shape of a circular cylinder which has a diameter of 15 [mm]. By the way, in this embodiment, the speaker 6 and the microphone 16 are disposed projecting beyond the arrangement plane of the control panel 14. It may be said, however, that the speaker 6 and the microphone 16 lie, in effect, substantially even with the body 2.

The geometries of the equipment 1 and its constituents, especially the size (h2, W1, D1) of the body 2 and the distance (h1) between the speaker 6 and the microphone 16, suffice for embracing the functions which are required for the equipment 1. Moreover, they have been determined considering the facility of carrying the equipment 1 in one hand, the operability of the equipment 1, etc. By way of example, the distance h1 has been determined as one according to which, when the speaker 6 (as set on the ear pad 4) is held to the user's ear, the microphone 16 comes near to the user's mouth. Accordingly, the geometries are not restricted to the aforementioned ones, and slight differences in the concrete values are not problematic, either.

Incidentally, an expression "casing" used in claim 1 signifies a concept which contains, not only the body 2, but also the ear pad 4 having the speaker 6 directly fixed thereto, in this embodiment. "Camera holding means" stated in claim 2 corresponds to the pivot 32, etc. in this embodiment.

On the other hand, "casing" stated in claim 3 corresponds to the body 2 in this embodiment, and "speaker holding means" corresponds to the ear pad 4, the speaker fixture 30, etc.

Next, the usage of the equipment 1 will be described.

In this embodiment, the handy type video telephone equipment 1 can assume two telephonic communication attitudes; a visual telephonic communication attitude which corresponds to the visual telephone function (pictures and speech), and a vocal telephonic communication attitude which is suitable for the vocal telephone function (only speech). Owing to the presence of the grip 35, the equipment 1 can be firmly held even in one hand in both the telephonic communication attitudes.

First, the user turns ON the power source switch 33 disposed on the left side surface of the body 2, thereby bringing the equipment 1 into the standby state. In this state, the equipment 1 can accept a call from the telephone equipment of any opposite person. Here, since the power source switch 33 is arranged near the thumb of the user's left hand carrying the equipment 1, the user can manipulate the switch 33 while holding the equipment 1 in his/her left hand, without specially changing the carrying hand. When a channel has been established between the user's equipment 1 and the opposite equipment, a ringing tone is emitted from the speaker 6. Then, the user can receive the information after depressing the transmission/reception key 12. In this case, whether or not the telephone communication is to deal with only speech is decided on the basis of the signal of the communication device 18 by the processor, and the decided result is displayed on the display panel 11. When the telephone conversation has ended, the user can bring the equipment 1 into the standby state again by depressing the termination key 13.

In a case where the user operates the equipment 1 as a video telephone set, he/she grasps the grip 35 in his/her left hand and manipulates the pertinent components with his/her right hand. By way of example, when the user is to start the transmission of the information in the standby state by the use of the visual telephone function, he/she slides the lens portion 24 of the camera 3 downwards and disengages it from the indent 25 using his/her right hand. Besides, he/she turns the camera 3 to the position of a desired angle (refer to FIG. 7). Subsequently, he/she depresses the transmission/ reception key 12 to bring the display panel 11 and the control panel 14 into the ON states thereof. Further, he/she selects the visual telephone function by manipulating the function change-over button 15a. Thereafter, he/she enters the telephone No. of the opposite party by fingering the ten-keys displayed on the control panel 14. Since the entered telephone No. of the opposite party is displayed on the display panel 11, the user acknowledges it. Lastly, the user depresses the transmission/reception key 12. Thus, the transmission to the opposite party of the entered telephone No. is started.

In this embodiment, a telephone No. list can be displayed on the control panel 14 by manipulating the picture frame change-over button 15b. Moreover, the display of the telephone No. list can be scrolled by manipulating the picture frame scroll buttons 15c and 15d. Accordingly, it is also possible to store a large number of telephone Nos. in the memory beforehand and to select the telephone No. of the opposite party for the transmission from among the stored telephone Nos.

After the telephone sets of both the parties have been connected, the user talks while looking at the display panel 11. In this case, the lens portion 24 of the camera 3 can be turned within the angular range of 240°. Therefore, the user can perform, not only a visual communication which Is based on the photographing of his/her face, but also a visual communication during which the third party or a scene is being photographed. Besides, in a case where the telephone conversation proceeds outdoors or where illumination reflects on the display panel 11, the user may draw down the ear pad 4. Then, the display becomes easy to see because the ear pad 4 intercepts external light falling on the display panel 11 (refer to FIG. 7). Meanwhile, in a case where the user does not want nearby persons to hear the content of the telephone conversation, he/she may draw out the speaker 6 to use it as the earphone (refer to FIG. 7). On this occasion, as stated before, the sound volume is automatically adjusted depending upon whether the speaker 6 is used in the state in which it is stored up in the ear pad 4, or it is detached from the ear pad 4 and is used as an earphone.

After the end of the telephone conversation, the user can bring the equipment 1 into the standby state again by depressing the termination key 13.

There will now be explained the use of the equipment 1 as an ordinary telephone set corresponding to speech only.

Even in a case where the vocal telephone function is utilized for the telephone conversation, the basic operations of the equipment 1 are substantially the same as in the case of using the equipment 1 as the video telephone set.

The user manipulates the pertinent components with his/her right hand while grasping the grip 35 in his/her left hand. When the user is to start the transmission of the information in the standby state by the use of the ordinary telephone function corresponding to only speech, he/she depresses the transmission/reception key 12 to bring the display panel 11 and the control panel 14 into the ON states. Besides, he/she selects the vocal telephone function by manipulating the function change-over button 15a. Thereafter, he/she enters the telephone No. of the opposite party by fingering the ten-keys displayed on the control panel 14. Since the entered telephone No. of the opposite party is displayed on the display panel 11, the user acknowledges it. Lastly, the user depresses the transmission/reception key 12. Thus, the transmission to the opposite party of the entered telephone No. is started. After the last manipulation, the user talks with the opposite party in the telephonic communication attitude as in a conventional handset in which the equipment 1 is so held that the ear pad 4 lies in contact with the ear of the talking person, namely, the user and that the microphone 16 lies near the user's mouth.

Even when the equipment 1 is being operated as the video telephone set, it can assume the same attitude as in the case of the telephone conversation corresponding to only the voices. In such an attitude, neither the display panel 11 nor the camera 3 can be used. The aspect of operation, however, is effective in a case where the user does not want nearby persons to hear the telephone conversation or where noise develops due to, e.g., automobile traffic during the course of the telephone conversation.

By the way, the control panel 14 being the liquid-crystal panel may well be replaced with a conventional button type panel or a numerical-key pad of sheet form.

The ear pad 4 and the camera 3 may well have their movements interlocked. Further, both the components 3 and 4 may well be provided unitary with either of them.

Although, in this embodiment, the camera 3 is mounted sidewards of the display panel 11, these components 3 and 11 may be disposed with their view points held in agreement. By way of example, the camera 3 is arranged so as to lie in contact with the top surface of the body 2 in the longitudinal direction of this camera. Besides, the pivot 32 of the camera 3 is disposed centrally of the top surface of the body 2. In this case, the lateral widths of the camera 3 and the body 2 should preferably be equalized.

Although, in this embodiment, the antenna 21 is disposed protruding from the body 2, the storability of the equipment 1 is enhanced in such a way that the amount of protrusion from the body 2 is reduced by, e.g., a structure unitary with the camera 3.

Moreover, the camera 3 may well be made detachable from the body 2. In this case, when the camera 3 is connected by a connection cord which can be drawn out through a hinge (32 in FIG. 1), the connection cord is hidden in the attached state of this camera. This is favorable from a design viewpoint.

As thus far described, in the handy type video telephone equipment 1 according to the present invention, the thin body 2 is formed with the grip 35 for grasping the equipment 1 in one hand, and it is also furnished with the camera 3 of alterable photographing angle, whereby the user can transmit and receive pictures and speech while holding the body 2 in one hand. Further, the ear pad 4 disposed above the display panel 11 is drawn down, whereby the influence of the external light falling on the display panel 11 can be avoided.

In addition, the speaker 6 and the microphone 16 are respectively disposed on one end side and the other end side of the body 2 in the longitudinal direction thereof, and the display panel 11 and the control panel 14 are both disposed between the speaker 6 and the microphone 16, whereby either of the visual telephonic communication attitude and the vocal telephonic communication attitude can be selected. Besides, since the equipment 1 can be used with the whole structure carried in one hand, it is excellent in operability. Also, since the equipment 1 is unitary as a whole, it is excellent in portability and storability in a bag or the like. Further, since the speaker 6 can be drawn out and used as the earphone, the equipment 1 is effective in cases where the telephone conversation is to be kept confidential and where the voice of the opposite party is difficult to hear. Yet further, since the handy type video telephone equipment 1 has the drip-proof structures executed in the pertinent places, it is effective for use outdoors.

A video telephone equipment in the second embodiment of the present invention will be described with reference to FIG. 9 thru FIG. 12.

Figure 9:
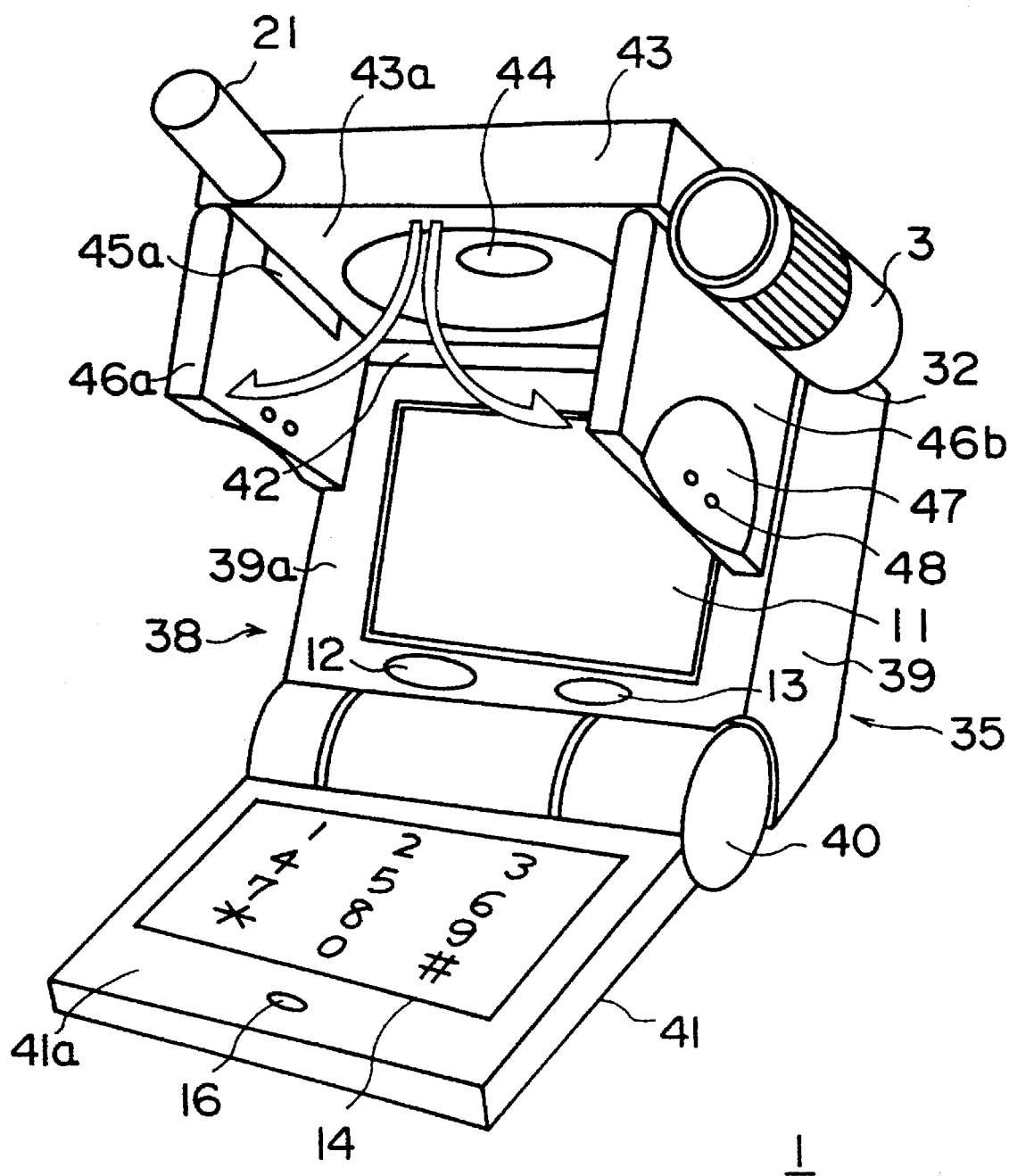
FIG. 9 is a perspective view showing the visual communication attitude of a video telephone equipment in the second embodiment of the present invention.
Figure 10:
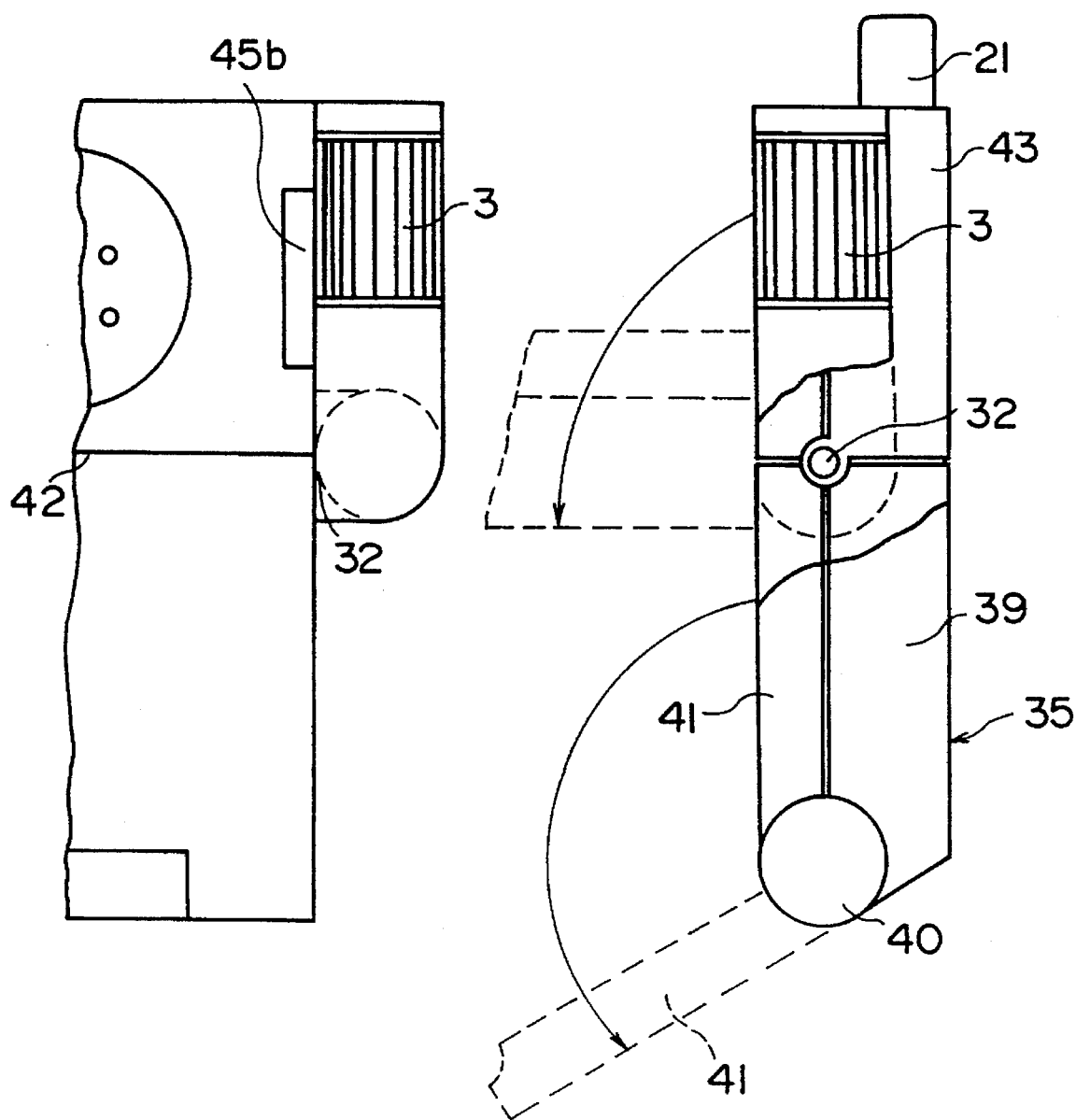
FIGS. 10(A) and 10(B) are a fragmentary front view and a side view, respectively showing the operating states of the second embodiment.
Figure 11:
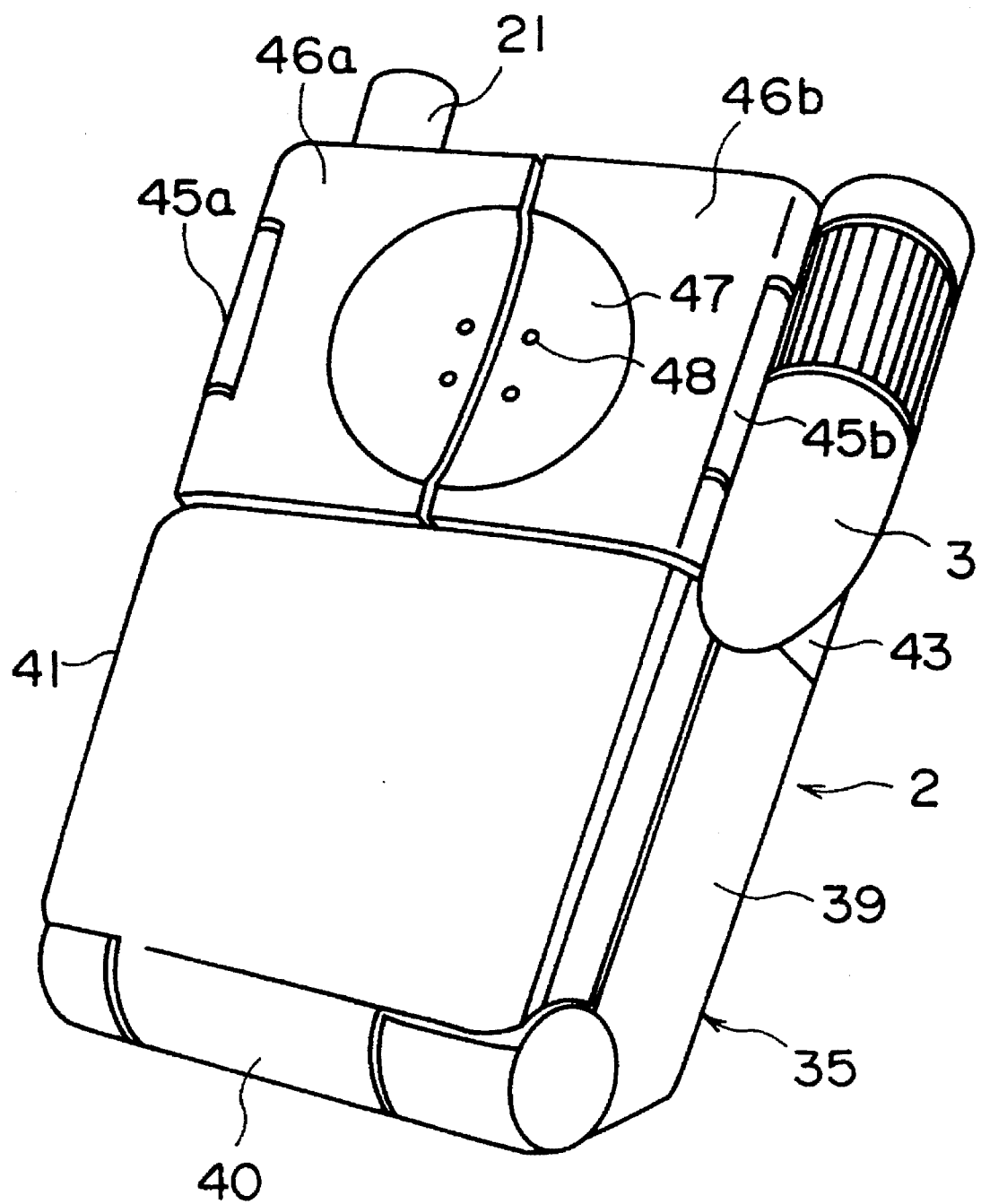
FIG. 11 is a perspective view showing the storage attitude of the second embodiment.
Figure 12:
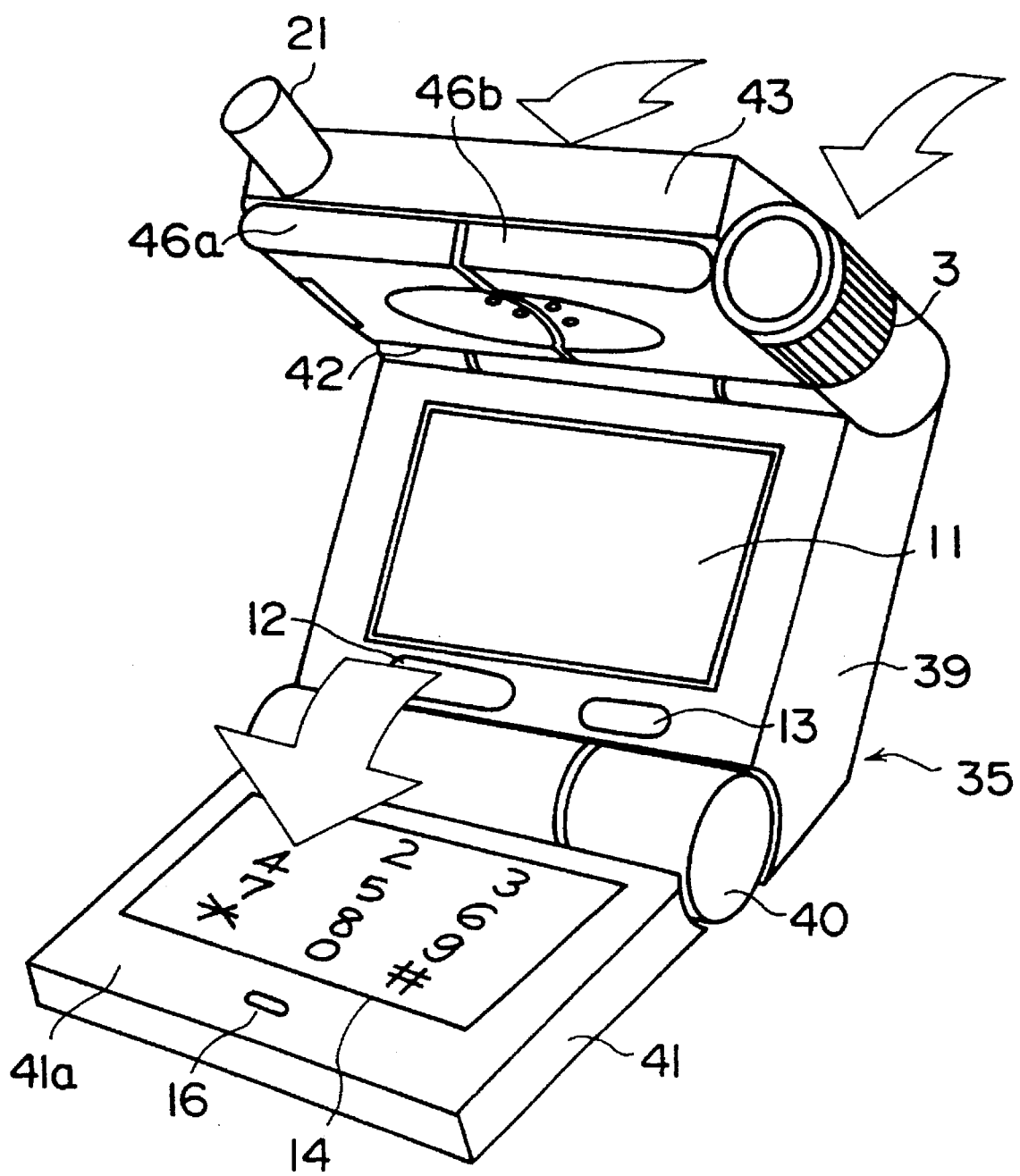
FIG. 12 is a perspective view showing the visual communication attitude of the second embodiment.

FIG. 9 is a perspective view showing one of the visual telephonic communication attitudes of the equipment, FIGS. 10(A) and 10(B) are explanatory views showing the operating states of the equipment, FIG. 11 is a perspective view showing the stored-up state of the equipment, and FIG. 12 is a perspective view showing the other visual telephonic communication attitude of the equipment. In these figures, the same portions as illustrated in FIG. 1 thru FIGS. 8(A) –8(C) are indicated by identical symbols.

This embodiment features that the body of the equipment is divided into a plurality of units or body portions, and that the units are coupled by hinges. Thus, the equipment can assume an installed telephonic communication attitude in which the body is installed on a table or the like, besides a carried or grasped telephonic communication attitude in which the body is held in one hand. Further, the storability of the equipment is enhanced.

As shown in FIG. 9 (taken in front perspective), the handy type video telephone equipment 1 of this embodiment is constructed including the body 38 which is thin and flat, a camera 3 which is turnably mounted on the right side surface of the body 38 through a hinge 32, an antenna 21 which is mounted on the top surface of the body 38, and a battery assembly (9, not shown) which is detachably mounted on the central part of the rear surface of the body 38.

The body 38 is configured of the three units of the first unit 39, second unit 41 and third unit 43. By the way, it is the casing of the second unit 41 that corresponds to an expression "first casing" in claim 11, Also, the casing of the third unit 43 corresponds to an expression "second casing". Further, the casing of the first unit 39 corresponds to an expression "third casing".

The front of the first unit 39 is formed with a function arrangement surface 39a, on which a display panel 11, a transmission/reception key 12 and a termination key 13 are arranged. Besides, a main circuit board (17, not shown) is built in the first unit 39, and the battery assembly (9, not shown) is detachably attached to the rear part of the first unit 39. The rear part of the first unit 39 and the battery assembly (9) form a grip 35 for holding the handy type video telephone equipment 1 in one hand. A power source switch (33, not shown) is disposed on the left side surface of the first unit 39.

The second unit 41 is foldably attached to the lower end of the first unit 39 through the hinge 40 (this hinge 40 corresponds to "first coupling means" stated in claim 11). This second unit 41 is formed with a function arrangement surface 41a, and a microphone 16 is disposed at the end of the function arrangement surface 41a remote from the hinge 40. In addition, a control panel 14 is arranged at a position intermediate between the microphone 16 and the hinge 40.

The function arrangement surfaces 41a and 39a have substantially equal areas, and the former 41a conceals the latter 39a in the state in which the second unit 41 is folded on the first unit 39.

The third unit 43 is arranged above the first unit 39. These units 43 and 39 are coupled in such a way that the lower end of the former 43 and the upper end of the latter 39 are turnably coupled by the hinge 42 (this hinge 42 corresponds to "second coupling means" stated in claim 11). The third unit 43 has a built-in communication device (18, not shown). Besides, a speaker 44 is arranged centrally of a function arrangement surface 43a which is formed in the front of the third unit 43.

Ear pad portions 46a and 46b formed of a soft material are respectively mounted on the left and right sides of the function arrangement surface 43a through hinges 45a and 45b (refer also to FIG. 11) so as to be freely opened and shut. The ear pad portions 46a and 46b conceal the function arrangement surface 43a in the state in which they are shut. By the way, the ear pad portions 46a and 46b are formed with a recess 47 which is provided with sound leakage holes 48. Owing to the sound leakage holes 48, a sound does not become difficult to hear even when the ear pad portions 46a and 46b are shut.

The camera 3 has its lower end turnably mounted on the pivot 32 which is arranged coaxially with the hinge 42. In this case, the camera 3 can be moved independently of the third unit 43. Besides, the turnable angular range of the camera 3 is set at 240° (frontward 120° ~ rearward 120°) with respect to the angular position of this camera parallel to the plane of the third unit 43. Incidentally, the camera 3 includes a lock mechanism which prevents the angle thereof from changing unintentionally at the angular position parallel to the plane of the third unit 43. It is also the same as the first embodiment in that ribs are provided for permitting the camera 3 to be set at any desired angle.

Although the practicable dimensions of the whole equipment and the constituent components are not indicated here, the geometries of the whole equipment 1, the distance between the speaker 44 and the microphone 16, and the geometries of the other components are determined from basically the same viewpoints as in the first embodiment. This holds true also of the other embodiments which will be described later.

The operating states of the equipment 1 will be explained with reference to FIGS. 10(A)–10(B) and FIG. 11. Incidentally, FIGS. 10(A) and 10(B) are a fragmentary front view and a right side view, respectively.

The attitudes which the handy type video telephone equipment 1 of this embodiment can assume, are broadly classified into three (storage attitude, vocal telephonic communication attitude, and visual telephonic communication attitude).

The storage attitude is as shown by solid lines in FIGS. 10(A) and 10(B), and in FIG. 11.

In the storage attitude, the second unit 41 is folded up to an angle at which it lies in contact with the first unit 39. On this occasion, the function arrangement surface 41a covers the function arrangement surface 39a, and the functional components arranged on these surfaces 39a and 41a can be protected. Moreover, the equipment 1 can be stored up with its full length shortened to the extent of folding the second unit 41.

Regarding also the third unit 43, the speaker 44 is covered by shutting the ear pad portions 46a and 46b. In this case, the ear pad portions 46a and 46b abut against the second unit 41 in the folded state, so that the third unit 43 is restrained from turning. Thus, the storage attitude can be kept. Besides, since the camera 3 is fixed at the angle depicted in FIG. 11, it hardly forms an obstacle.

In this manner, in the storage attitude, the handy type video telephone equipment 1 is compactly folded up as a whole, and it can be brought into the thin and flat shape of slight unevenness. Accordingly, the storage attitude is effective for, e.g., carrying the equipment 1 and storing it in a bag or the like.

Next, the vocal telephonic communication attitude will be explained.

In the vocal telephonic communication attitude, the second unit. 41 is held at an angular position of 120° with respect to the first unit 39 (the second unit 41 indicated by a broken line in FIG. 10(B) corresponds to this state). On the other hand, the third unit 43 is held parallel to the first unit 39 (the third unit 43 indicated by solid lines in FIG. 10(B) corresponds to this state).

In this attitude, the user of the equipment 1 can firmly grasp the rear part of the first unit 39 as the grip 35 in one hand. Moreover, he/she can bring the speaker 44 and the microphone 16 to positions corresponding to his/her ear and mouth, respectively.

Next, the visual telephonic communication attitude will be explained.

The visual telephonic communication is subdivided into two attitude.

One of the two attitudes is the state (refer to FIG. 12) in which the third unit 43 is thrown down 90° frontwards from the vocal telephonic communication attitude. In this state, the third unit 43 fulfills the function of a hood. Therefore, this attitude is effective to intercept external light which arrives-downwards to reflect on the display panel 11.

The other attitude is the state (refer to FIG. 9) in which the ear pads 46a and 46b are further opened 90° from the state shown in FIG. 12. In this state, it is possible to cover, not only the upper side of the display panel 11, but also both the right and left sides thereof. Therefore, this attitude is effective especially in case of using the equipment 1 outdoors. Moreover, the speech emitted from the speaker 44 is arrested and reflected by the ear pad portions 46a, 46b and the first unit 39, so that a high directivity is exhibited. This produces the important merit that the talking person, namely, the user can easily hear the voice, whereas nearby persons have difficulty hearing it.

Besides, in the visual telephonic communication attitude (FIG. 9 or FIG. 12), the center of gravity of the handy type video telephone equipment 1 as a whole shifts forwards owing to the downthrow of the third unit 43, and the equipment 1 can stand by itself on the table or the like with the second unit 41 as a base. Accordingly, this attitude can be also termed the "installed telephonic communication attitude".

Incidentally, although the visual telephone function can be utilized even in the vocal telephonic communication attitude, the visual telephonic communication attitude shown in FIG. 9 or FIG. 12 as stated above is effective for better visibility of the display panel 11.

A video telephone equipment in the third embodiment of the present invention will be described with reference to FIG. 13 thru FIGS. 16(A)–16(B).

Figure 13:
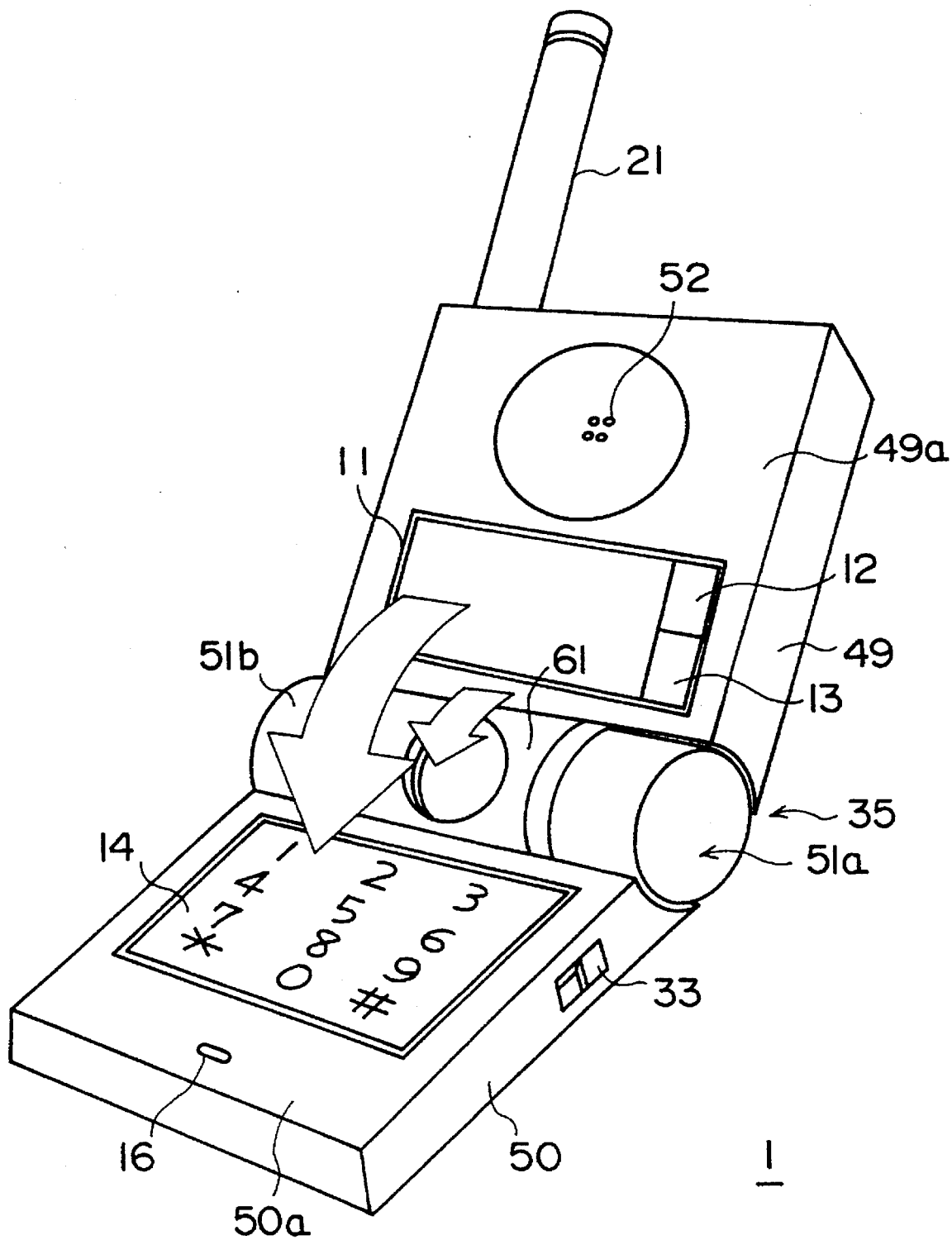
FIG. 13 is a perspective view showing the visual communication attitude of a video telephone equipment in the third embodiment of the present invention.
Figure 14:
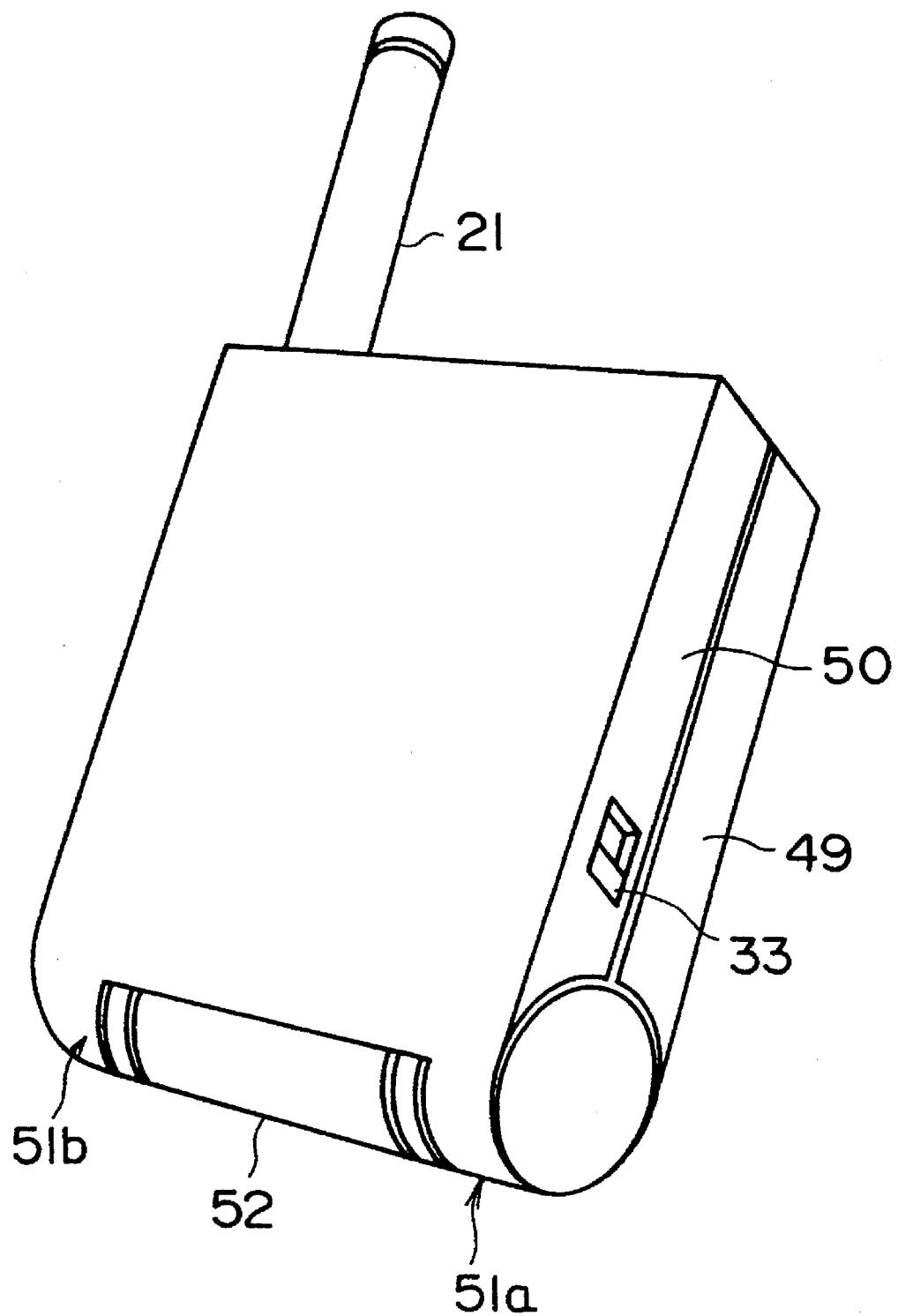
FIG. 14 is a perspective view showing the storage attitude of the third embodiment.
Figure 15:
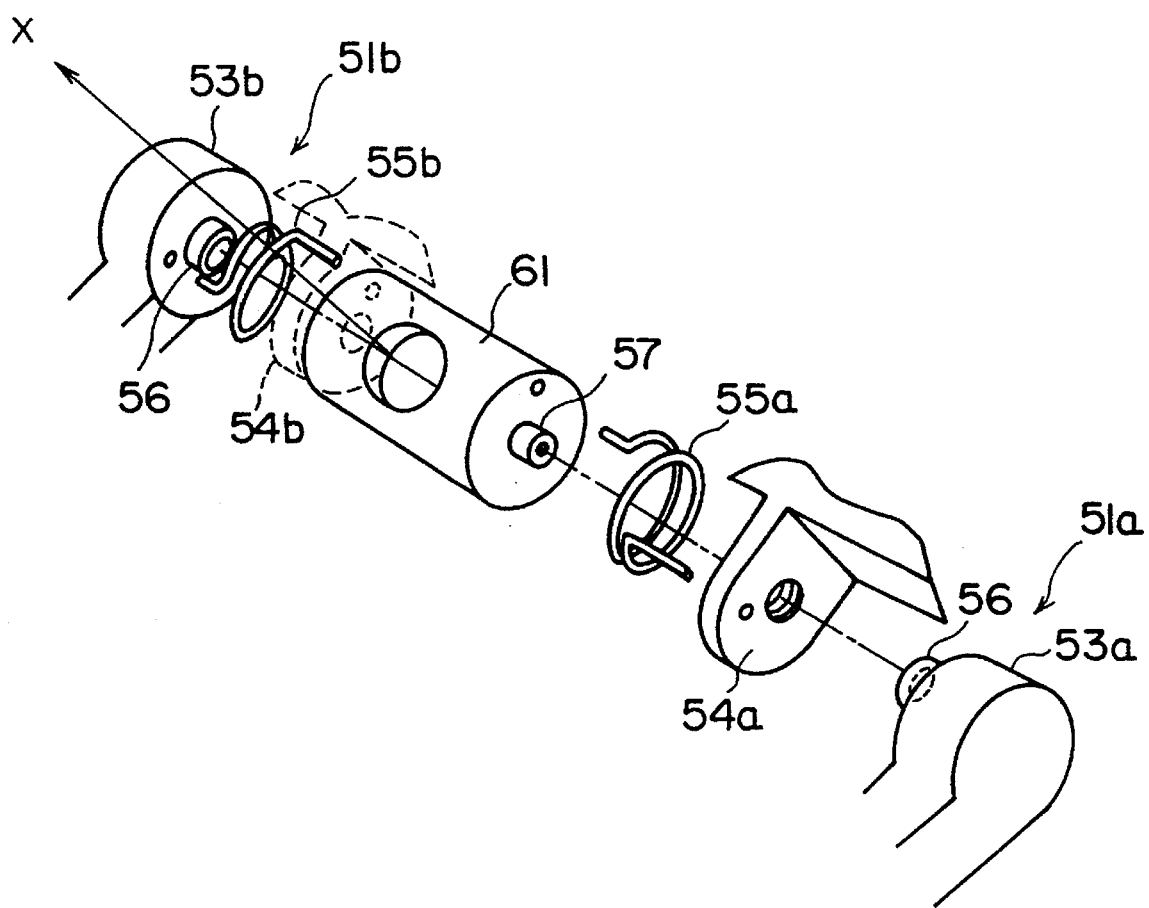
FIG. 15 is a schematic structural view showing a holding mechanism and hinges for a camera included in the third embodiment.

FIG. 13 is a perspective view showing the state of use of the equipment, FIG. 14 is a perspective view showing the stored-up state of the equipment, FIG. 15 is a schematic structural view showing a hinge mechanism, and FIGS. 16(A) and 16(B) are views for explaining the movements of a camera. In these figures, the same portions as illustrated in FIG. 1 thru FIG. 12 are indicated by identical symbols, and they shall be omitted from description.

This embodiment features that the body of the equipment is divided into two units or body portions, which are foldably coupled by two hinges, and that a camera is disposed in the hinge structure, thereby enhancing the portability and operability of the equipment.

As shown in FIG. 13, the handy type video telephone equipment 1 of this embodiment is chiefly constructed of the first unit 49, the second unit 50, the hinges 51a and 51b by which the first unit 49 and the second unit 50 are foldably coupled, the camera 61 which is turnably mounted in the assembled structure of the hinges 51a and 51b, and an antenna 21 which is mounted on the first unit 49. By the way, "coupling means" stated in claims 4 and 8 corresponds to the hinges 51a and 51b in this embodiment.

The first unit 49 has a communication device (18, not shown) built therein, and has a detachable battery assembly (9, not shown) attached to the rear surface thereof. The front of the first unit 49 is formed with a function arrangement surface 49a. A speaker 52 is arranged on the upper part of the function arrangement surface 49a, while a display panel 11 and a transmission/reception key 12 as well as a termination key 13 are arranged on the lower part of the surface 49a.

The second unit 50 has a built-in main circuit board (17, not shown). The front of the second unit 50 is formed with a function arrangement surface 50a, on which a microphone 16 is arranged near the end of this surface remote from the hinges 51a and 51b. In addition, a control panel 14 is arranged between the microphone 16 and the hinge structure composed of the hinges 51a and 51b.

The first unit 49 and the second unit 50 are thin and flat. Besides, the function arrangement surfaces 49a and 50a have substantially the same shapes and areas. When the equipment 1 is folded up so as to bring both the function arrangement surfaces 49a and 50a into contact, it falls into a thin and flat state as a whole. This state corresponds to the storage attitude of the equipment 1 (refer to FIG. 14).

The camera 61 is attached to coupling parts based on the hinges 51a and 51b (more precisely, it is mounted at a position intermediate between the left hinge 51b and the right hinge 51a). Herein, the camera 61 is turned in, interlocking with the opening or shutting movement (unfolding or folding movement) of the first unit 49 and second unit 50, thereby changing its angular position. Such a turning structure will be explained with reference to FIG. 15 and FIGS. 16(A) and 16(B).

The camera 61 has an optical axis X which is orthogonal to the longitudinal direction thereof.

Supporters 54a and 54b formed in the first unit 49 are located inside supporters 53a and 53b formed in the second unit 50. The supporters 54a and 54b are formed with holes, into which pins 56 erected on the supporters 53a and 53b are snugly fitted, respectively. Thus, the first unit 49 and the second unit 50 are turnably coupled.

Pins 57 are erected on the ends of the camera 61 in the longitudinal direction thereof, and are turnably mounted on the supporters 54a and 54b, respectively. A torsion spring 55a is interposed between the supporter 54a and the camera 61. The torsion spring 55a has its one end fixed to the camera 61, and has its other end fixed to the supporter 54a. A torsion spring 55b is interposed between the supporters 53b and 54b. The torsion spring 55b has its one end fixed to the supporter 53b, and the other end of the torsion spring 55b is fixed to the camera 61 beyond the supporter 54b.

The torsion springs 55a and 55b urge the camera 61 in directions opposite to each other, and they are in a balanced state.

"Angle keeping means" stated in claim 9 corresponds to the torsion springs 55a and 55b, etc. in this embodiment.

The movements of the equipment 1 during the use thereof will be detailed in conjunction with FIGS. 16(A) and 16(B). These figures are side views showing the states of use. When the first unit 49 and the second unit 50 are opened (unfolded), the camera 61 has its angular position changed by the stresses of the torsion springs 55a and 55b. Since, in this case, both the torsion springs 55a and 55b are balanced, the camera 61 is moved so that the optical axis X may be always located at the central angular position of the open angle θ between the first unit 49 and the second unit 50. That is, the camera 61 has its facing direction changed in accordance with the angle θ of the equipment 1. It is therefore easy to keep the state in which the camera 61 catches the face of the person talking, namely, the user (when the person talking looks at the display panel 11, his/her face often lies in the direction of θ/2). Incidentally, the arrangement and the angle keeping mechanism of the camera as adopted in this embodiment are also applicable to the other embodiments.

Further, the intersection point P between the optical axis Y of the display panel 11 and that X of the camera 61 can be adjusted in correspondence with the turning angle θ. Therefore, the visibility of the display panel 11 is superior, and the position of the person talking which is good for photographing can be easily attained.

As described above, according to this embodiment, the visibility of the display panel 11 and the photographing position of the camera 61 can be adjusted with ease. In the storage attitude, the whole equipment 1 is in the thin and flat state, so that the storability and portability thereof are favorable. Moreover, the equipment 1 can be firmly grasped in one hand in each of a vocal telephonic communication attitude in which the microphone 16 and the speaker 55 are respectively held near the mouth and ear of the talking person, and a visual telephonic communication attitude in which the display panel 11 confronts to the talking person. Besides, the adjustment of the angle of the camera 61 can be made less laborious.

Figure 17:
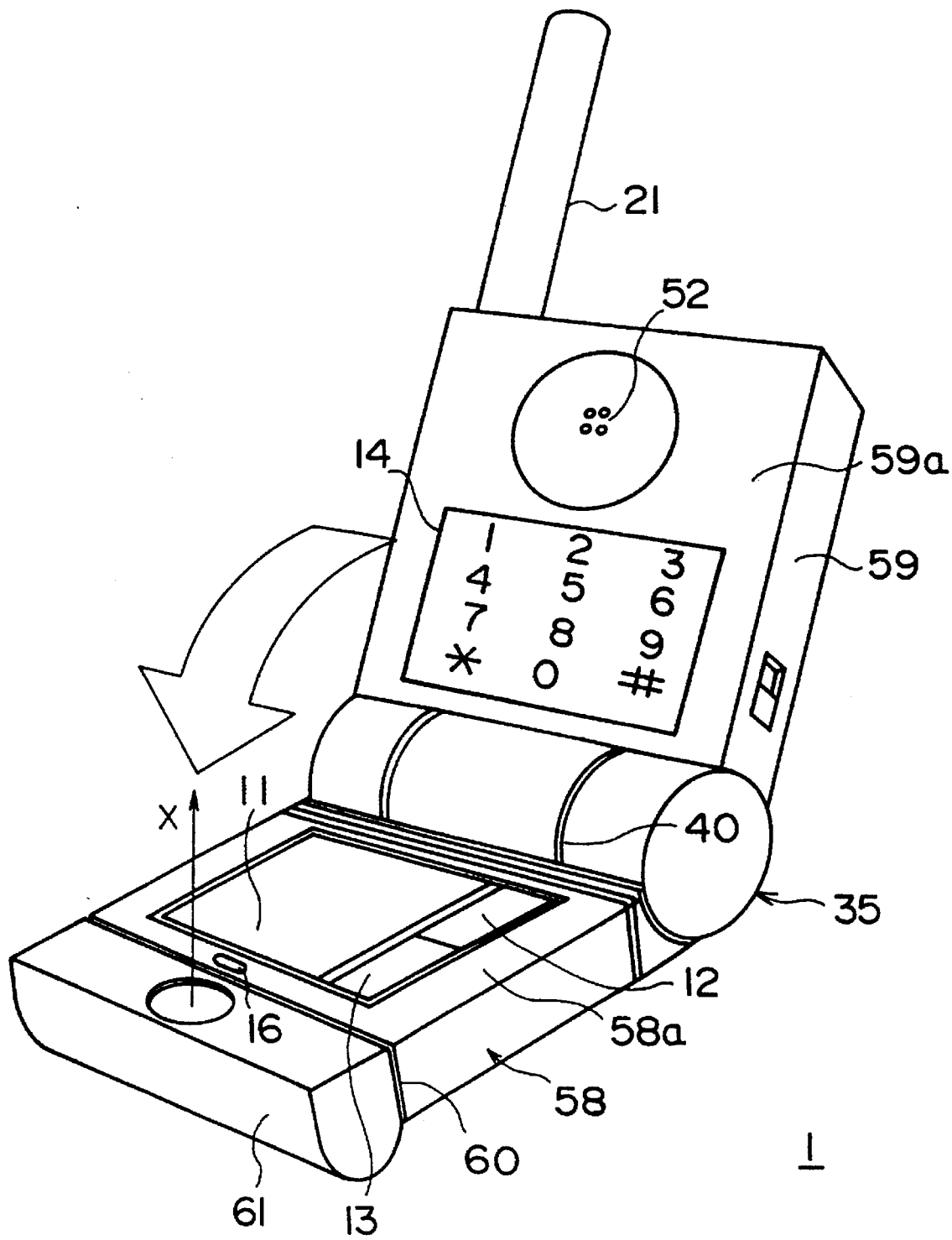
FIG. 17 is a perspective view showing the vocal communication attitude of a video telephone equipment in the fourth embodiment of the present invention.
Figure 18:
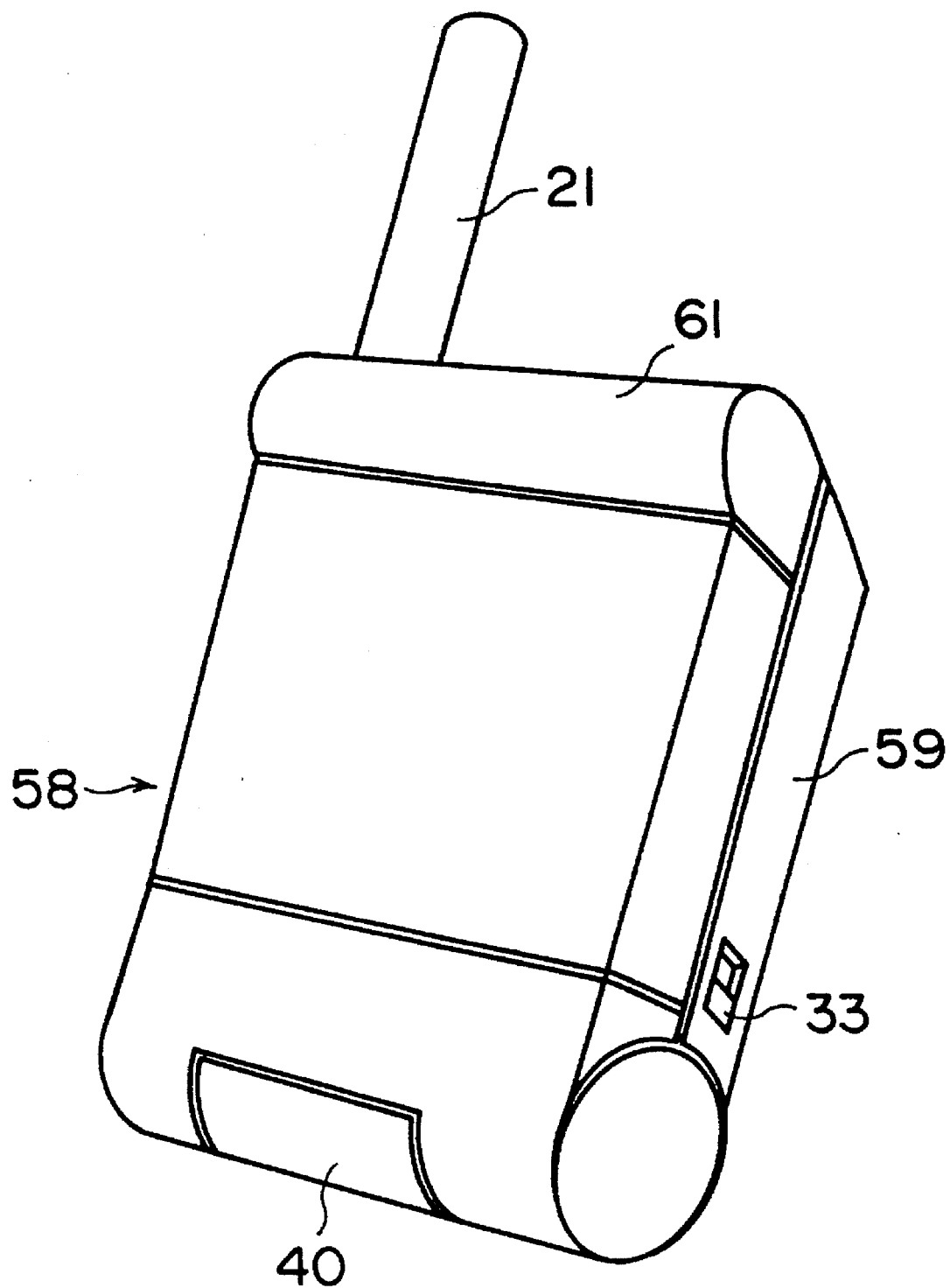
FIG. 18 is a perspective view showing the storage attitude of the fourth embodiment.
Figure 19:
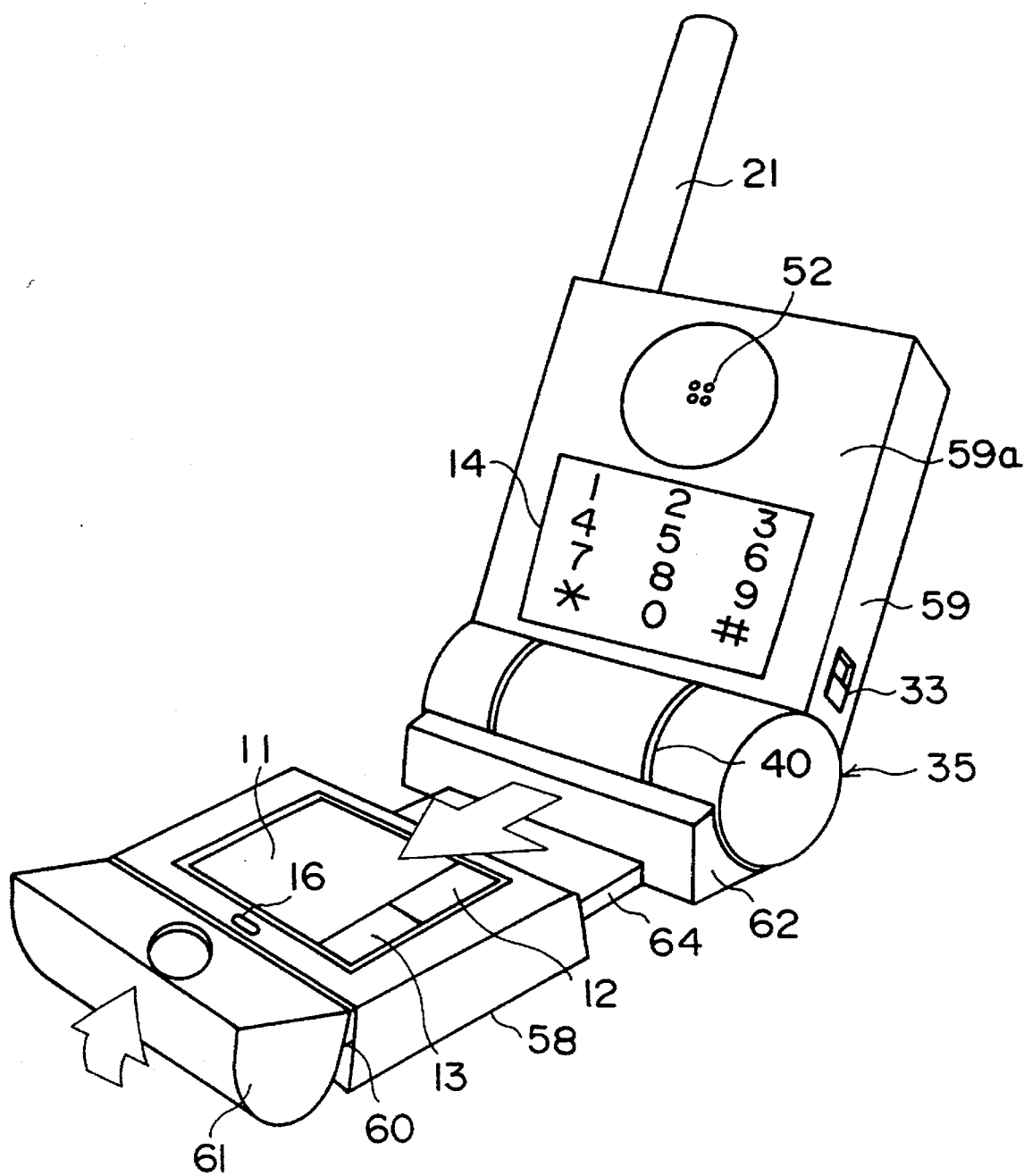
FIG. 19 is a perspective view showing the visual communication attitude of the fourth embodiment.
Figure 20:
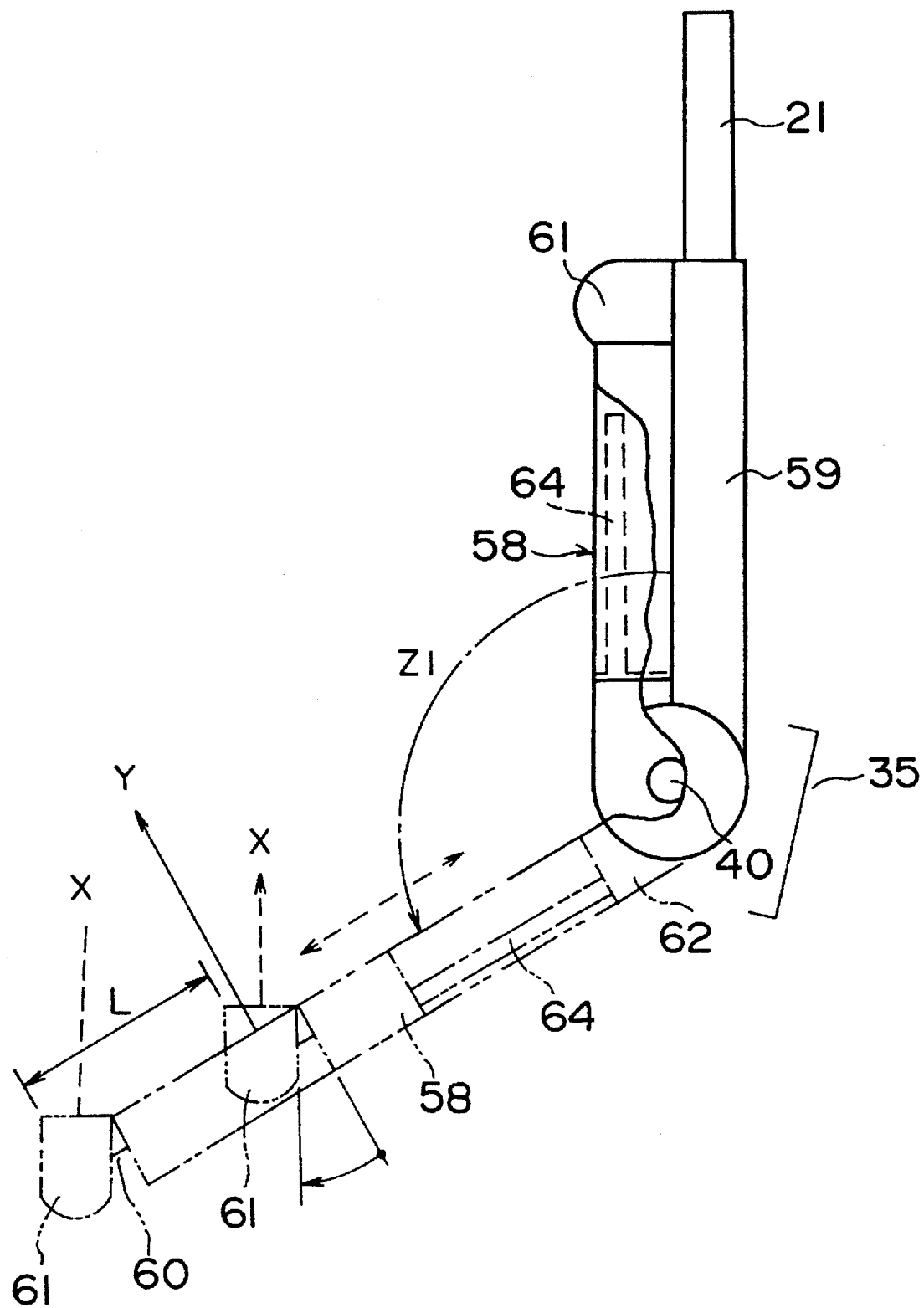
FIG. 20 is a view for explaining the operating states of the fourth embodiment.

A video telephone equipment in the fourth embodiment of the present invention will be described with reference to FIG. 17 thru FIG. 20. FIG. 17 is a perspective view showing the vocal telephonic communication attitude of the equipment, FIG. 18 is a perspective view showing the storage attitude thereof, FIG. 19 is a perspective view showing the vocal/visual telephonic communication attitude thereof, and FIG. 20 is a side view showing the schematic structure thereof. In these figures, the same portions as illustrated in FIG. 1 thru FIG. 16 are indicated by identical symbols, and they shall be omitted from description.

This embodiment consists in that the body of the equipment is divided into a unit or body portion including a speaker, and a unit or body portion including a microphone, both the units being foldably coupled by a hinge, and that a camera is disposed at the end of the unit including the microphone, whereby the equipment assumes the attitudes corresponding to both speech and pictures.

Referring to FIGS. 17 and 18, the handy type video telephone equipment 1 is chiefly constructed of the first unit 58 which is thin and flat, the second unit 59 which is thin and flat, the hinge 40 by which the first unit 58 and the second unit 59 are foldably coupled, the camera 61 which is turnably mounted on the first unit 58 through a hinge 60, and an antenna 21 which is mounted on the second unit 59.

The first unit 58 has a built-in main circuit board (17, not shown). The front of the first unit 58 is formed with a function arrangement surface 58a, on which the microphone 16 is arranged near the end of this surface remote from the hinge 40. In addition, a display panel 11 and a transmission/ reception key 12 and a termination key 13 are arranged between the microphone 16 and the hinge 40. By the way, the first unit 58 and the hinge 40 are not connected stationarily, but they are connected through the coupling portion 62 (FIGS. 19 and 20) of the hinge 40. This feature will be explained in detail later.

The second unit 59 includes a communication device (18, not shown) therein, and has a detachable battery assembly (9, not shown) attached to the rear thereof. The front of the second unit 59 is formed with a function arrangement surface 59a, on which the speaker 52 is arranged near the end of this surface remote from the hinge 40. In addition, a control panel 14 is arranged between the speaker 52 and the hinge 40.

The camera 61 has an optical axis X which is perpendicular to the longitudinal direction thereof. Besides, the camera 61 is attached to the end of the first unit 58 opposite to the hinge 40, through the hinge 60. Thus, the camera 61 is turnable so as to be raised up in the direction of a thick arrow indicated in FIG. 19. The dimension (length) of the camera 61 in the longitudinal direction thereof is equalized to the lateral width of the first unit 58.

The structure of the hinge 40 and the coupling thereof with the first unit 58 will be explained with reference to FIGS. 19 and 20.

The hinge 40 is constructed including the lower end of the second unit 59 and the coupling portion 62 as movable ends. The coupling portion 62 is furnished with a coupling plate 64, through which the hinge 40 is coupled with the first unit 58. More specifically, the first unit 58 is internally provided with an insertion slot, into which the coupling plate 64 is inserted, thereby coupling the hinge 40 and the first unit 58. Further, the coupling is not stationary, but the coupling plate 64 is held slidable in the insertion slot. Accordingly, the first unit 58 is movable in the direction of the coupling plate 64. Besides, a connection cord for connecting the first unit 58 and the second unit 59 is passed through the interior of the coupling plate 64.

By the way, "coupling means" stated in claim 6 corresponds to the hinge 40, the coupling plate 64, the insertion slot, etc. in this embodiment. A word "slide" signifies the movement in the direction of the coupling plate 64 in this embodiment.

The attitudes of the individual aspects of usage of this embodiment will be explained.

The state in which the first unit 58 is folded so as to overlie the second unit 59, is the storage attitude (refer to FIG. 18), In this storage attitude, the function arrangement surface 59a is covered with the first unit 58 and the camera 61, so that the function arrangement surface 59a, the camera 61, etc. can be protected. Moreover, the whole equipment 1 can hold the thin and flat state, and the storability and external appearance thereof are good (refer to FIG. 18, and solid lines in FIG. 20). By the way, although not explained in the foregoing, the function arrangement surfaces 59a and 58a have substantially the same shapes and areas, and they lie one upon the other exactly in the storage attitude.

In order to establish the telephonic communication attitude from the above storage attitude, the first unit 58 is turned 120° in the direction of an arrow Z1 indicated in FIG. 20. The telephonic communication attitude is indicated by broken lines in FIG. 20. In the telephonic communication attitude, a bent grip 35 is formed at the rear part of the hinge 40, so that a talking person or a user can firmly grasp the handy type video telephone equipment 1 in one hand. Herein, when the talking person holds the speaker 52 to his/her ear, he/she can locate the microphone 16 near and in front of his/her mouth. Therefore, the favorable vocal telephonic communication attitude corresponding to voices can be attained. Moreover, in this embodiment, the display panel 11 and the camera 61 are disposed in proximity to the microphone 16, and the camera 61 can be raised up. Therefore, the equipment 1 can assume the vocal/visual telephonic communication attitude suited to the transmission and reception of both speech and pictures.

In addition, when the first unit 58 is drawn out, the display panel 11 and the camera 61 can be moved downwards within the range of a drawable distance L (indicated in FIG. 20). Accordingly, the display panel 11 can be adjusted to a position at which it is easier to see. Further, the photographing angle of the camera 61 can be adjusted.

Incidentally, in a case where the coupling plate 64 is endowed with a curvature beforehand, the optical axis Y of the display panel 11 can be directed upwards (as viewed In FIG. 20) as the first unit 58 is drawn out. Thus, the display panel 11 can be seen easily.

The camera 61 may well be replaced with one which has an optical axis extending in the longitudinal direction thereof. In this case, the arrangement position of the camera is identical in itself, but the structure thereof for the coupling with the first unit 58 is altered. More specifically, a pin or pivot which extends perpendicularly to the longitudinal direction of the camera is disposed, and the camera is coupled in a turnable state by the pin.

A video telephone equipment in the fifth embodiment of the present invention will be described with reference to FIG. 21 thru FIG. 23.

Figure 21:
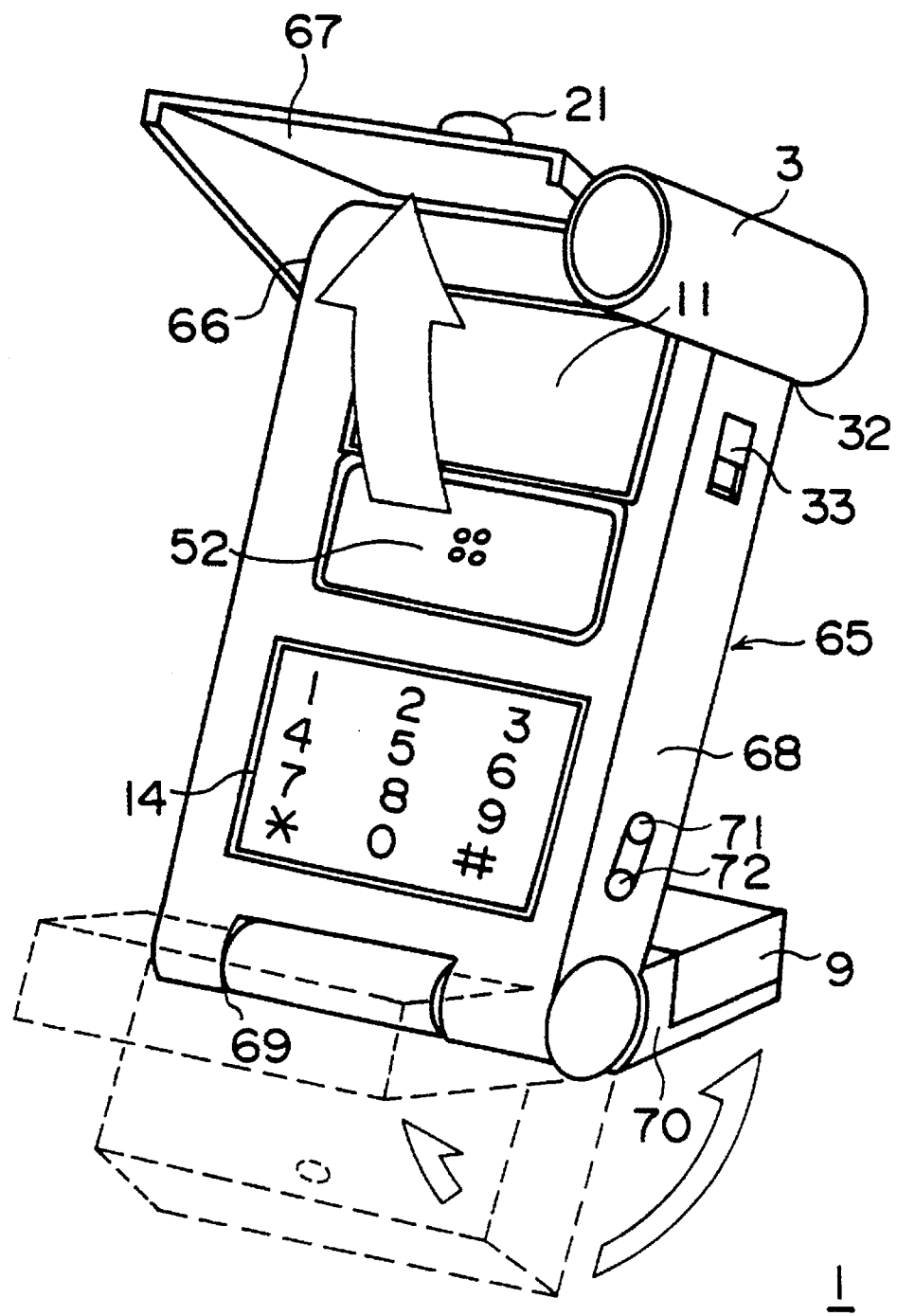
FIG. 21 is a perspective view showing the visual communication attitude of a video telephone equipment in the fifth embodiment of the present invention.
Figure 22:
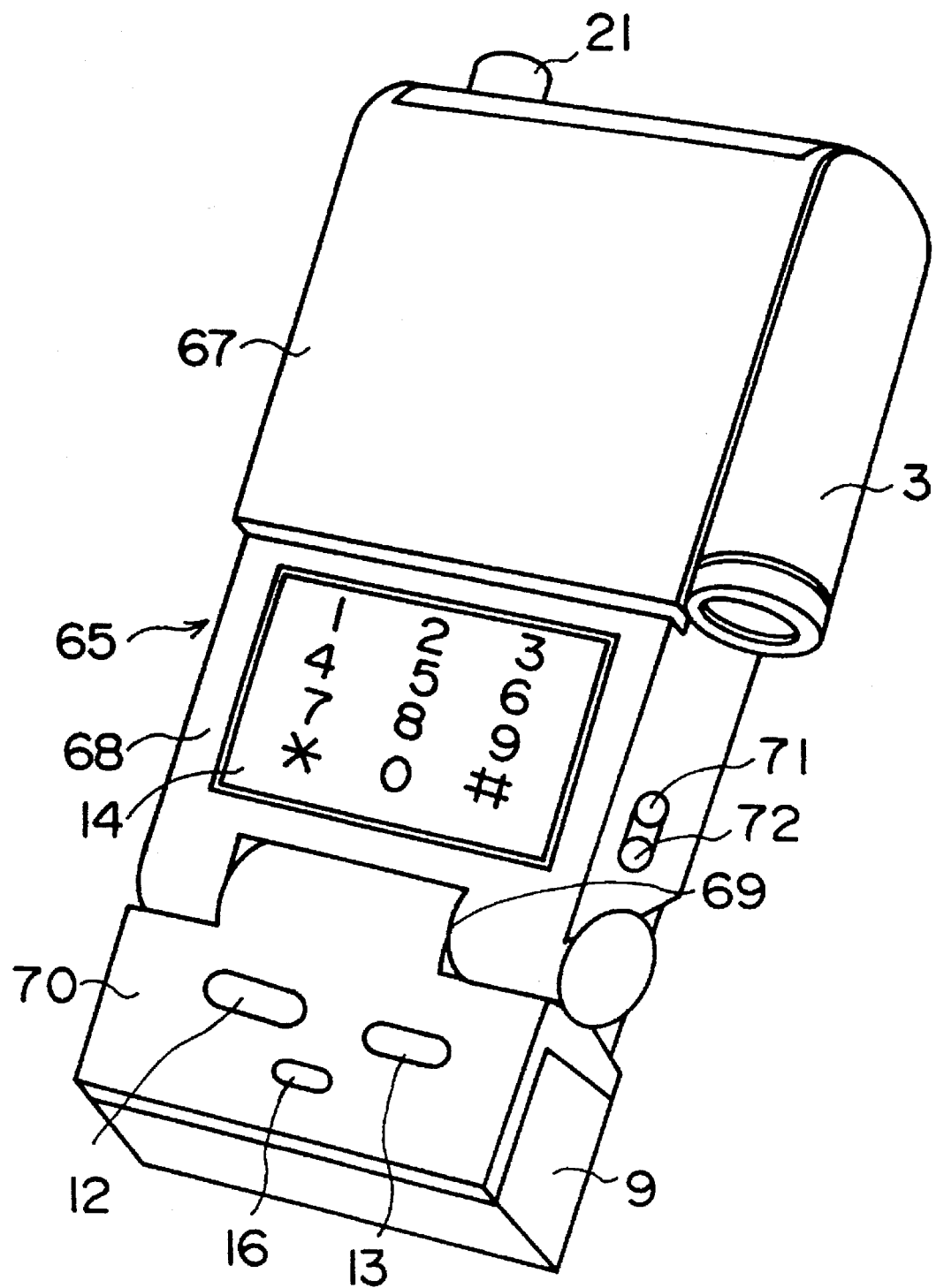
FIG. 22 is a perspective view showing the storage attitude of the fifth embodiment.
Figure 23:
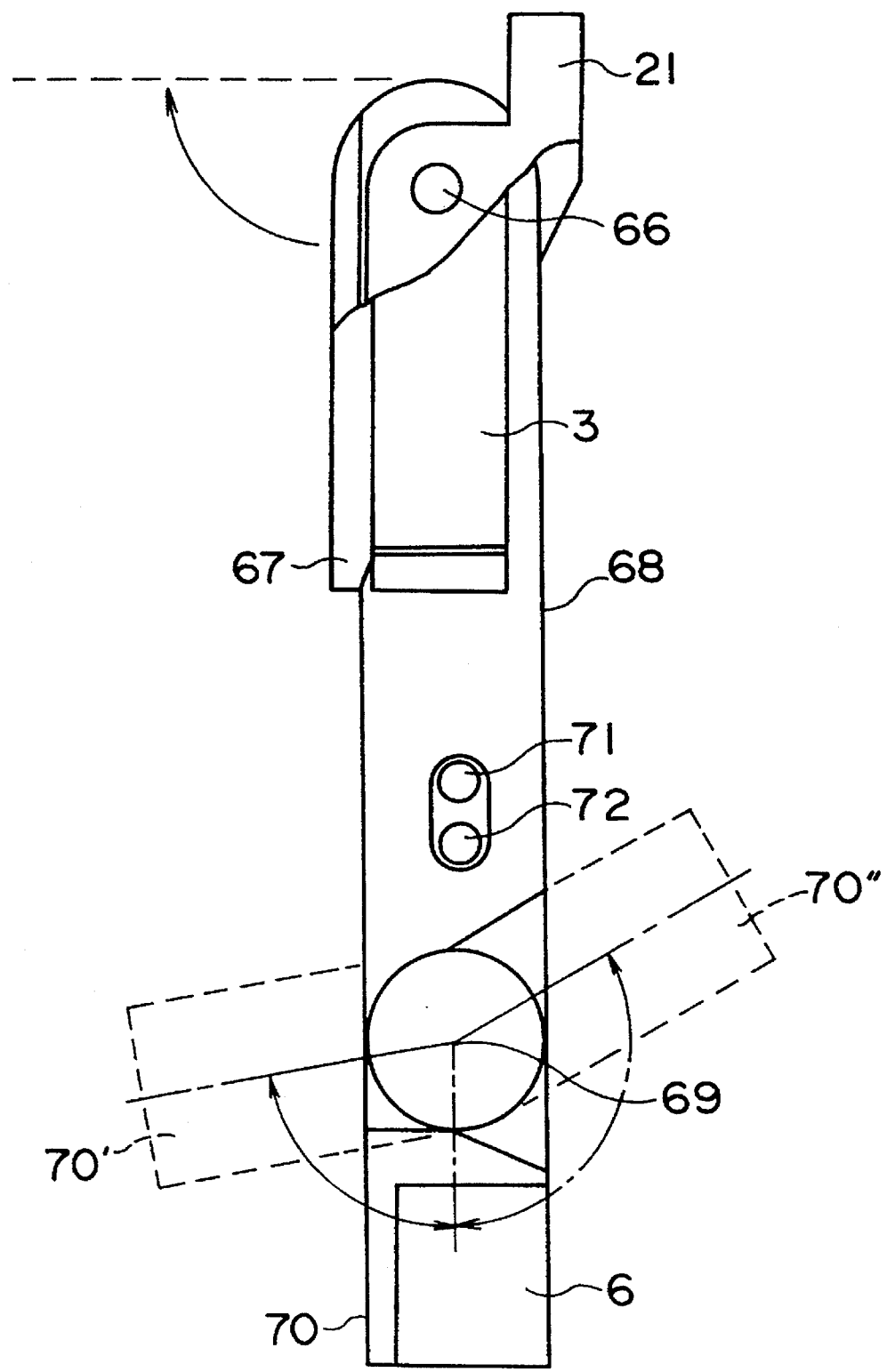
FIG. 23 is a view for explaining the operating states of the fifth embodiment.

FIG. 21 is a perspective view showing the visual telephonic communication attitude of the equipment, FIG. 22 is a perspective view showing the storage attitude thereof, and FIG. 23 is a view for explaining the operation thereof. In these figures, the same portions as illustrated in FIG. 1 thru FIG. 20 are indicated by identical symbols, and they shall be omitted from description.

This embodiment consists in that the body of the equipment is divided into a plurality of units or body portions, which are coupled by a hinge so as to change the form or external appearance of the equipment. Thus, the equipment can assume an installed telephonic communication attitude in which the body is installed on a table or the like, besides a carried or grasped telephonic communication attitude in which the body is held in one hand.

The handy type video telephone equipment 1 is constructed of the body 65 which is thin and flat, a camera 3, a hood 67, an antenna 21, and a battery assembly 9.

The body 65 is chiefly configured of the first unit 68 and the second unit 70 which are thin and flat.

The first unit 68 has a main circuit board (17, not shown) and a communication device (18, not shown) built therein. A display panel 11, a speaker 52 and a control panel 14 are disposed on the front surface of the first unit 68. In addition, a power source switch 33, an earphone Jack 71 and a microphone jack 72 are disposed on the right side surface of the first unit 68.

The second unit 70 is thin and flat, and it is turnably attached to the lower end of the first unit 68 through the hinge 69. It is turnable in a range of 80° frontwards (leftwards as viewed in FIG. 23) and 120° rearwards. A transmission/reception key 12 and a termination key 13 are arranged on the middle part of the front of the second unit 70, and a microphone 16 is disposed below these keys. Besides, the battery assembly 9 which is detachable is attached to the rear of the second unit 70.

The hood 67 is turnably mounted on the upper part of the front of the body 65 through a hinge 66. This hood 67 has an area and a shape which suffice to conceal the display panel 11 and the speaker 52, in the folded (shut) state thereof, and to intercept external light entering the display panel 11, in the opened (unfolded) state thereof. Although the hinge 66 is coaxial with the hinge 32 of the camera 3, the hood 67 and the camera 3 can be turned independently of each other.

By the way, the hood 67 can be fixed at any desired angular position within a range of at most 90° relative to the first unit 68.

The camera 3 is turnably mounted on the side surface of the body 65 through the hinge 32. Although, in this embodiment, the camera 3 and the hood 67 are disposed independently, the former 3 may well be attached to the latter 67 so as to interlockingly move them.

The antenna 21 is mounted on the rear upper part of the body 65.

The battery assembly 9 is detachably mounted on the rear lower part of the body 65.

The attitudes of the individual aspects of usage of this embodiment will be explained.

The storage attitude is illustrated in FIG. 22. In this attitude, the hood 67 is completely shut to cover the display panel 11 and the speaker 52. Besides, the second unit 70 is turned into the same direction as that of the first unit 68. In this attitude, the display panel 11 and the speaker 52 can be protected. Moreover, the body 65 can be held in a thin, flat and elongate shape, so that the storability and portability of the equipment 1 are high. By the way, even in the storage attitude, the telephonic communication of only speech is permitted by connecting a separate earphone to the earphone jack 71. It is also allowed to connect a separate microphone to the microphone jack 72.

Next, in shifting the equipment 1 from the storage attitude into the visual telephonic communication attitude, the user may turn the second unit 70 frontwards and open the hood 67. In the visual telephonic communication attitude, the user carries the body 65. In the carried state, the camera 3, etc. touch the user's fingers, so that the equipment 1 can be firmly grasped even in one hand. Moreover, since the hood 67 overlies the display panel 11, the visibility of this display panel can be enhanced. Besides, regarding telephone conversation not to be heard by nearby persons, it is possible to use the earphone and the microphone which are separate elements.

Further, in the visual telephonic communication attitude stated above, the handy type video telephone equipment 1 can be stood by itself with the second unit 70 as a base. In this attitude, the battery assembly 9 of heavy weight lies at a lower rear position, whereas the camera 3 and the hood 67 lie at forward positions, so that the equipment 1 is stable, In this sense, the visual telephonic communication attitude can be also termed the "installed telephonic communication attitude". By the way, when the second unit 70 is turned rearwards into a state indicated by solid lines in FIG. 21, the stability of the equipment 1 in the installed telephonic communication attitude is heightened more. In this case, the separate microphone is used for the vocal telephonic communication. If necessary, the separate earphone may well be used. In this manner, according to this embodiment, the equipment 1 can assume the multifarious telephonic communication attitudes. Incidentally, each of the embodiments described before may well be similarly constructed so as to assume the installed telephonic communication attitude, if the second unit 41 including the microphone 16 can be turned even to the rear side (through the hinge 40).

What is claimed is:

1. A video telephone equipment, comprising:

signal processing means for permitting at least either of a vocal communication and a visual communication;

a speaker which emits received speech for the vocal communication;

a microphone which accepts speech to-be-transmitted for said vocal communication;

a display panel which displays a received picture for the visual communication;

a camera which takes a picture to-be-transmitted for said visual communication;

a control panel through which a user of said video telephone equipment gives an operation command to said signal processing means;

a casing which is provided with said display panel, said speaker and said microphone; and camera holding means for holding said camera, said camera holding means having a shaft with which said camera is mounted on said casing so that an angular position of said camera relative to said casing is alterable, wherein said display panel is arranged between said speaker and said microphone on said casing.

2. A video telephone equipment, comprising:

signal processing means for permitting at least either of a vocal communication and a visual communication;

a speaker which emits received speech for the vocal communication;

a casing which is provided with said speaker;

a microphone which accepts speech to-be-transmitted for said vocal communication;

a display panel which displays a received picture for the visual communication;

a camera which takes a picture to-be-transmitted for said visual communication;

a control panel through which a user of said video telephone equipment gives an operation command to said signal processing means; and speaker holding means for holding said speaker in a state in which the speaker is detachable from said casing and being configured and operatively connected selectively to prevent external light from reaching said display panel.

3. A video telephone equipment, comprising:

signal processing means for permitting at least either of a vocal communication and a visual communication;

a speaker which emits received speech for the vocal communication;

a microphone which accepts speech to-be-transmitted for said vocal communication;

a display panel which displays a received picture for the visual communication;

a camera which takes a picture to-be-transmitted for said visual communication;

a control panel through which a user of said video telephone equipment gives an operation command to said signal processing means;

a first casing in which said microphone is encased;

a second casing in which said speaker is encased;

a third casing in which said display panel is encased;

first coupling means for coupling the first and third casings; and second coupling means for coupling the second and third casings; wherein at least the second one of the first and second coupling means being capable of altering an angle of the coupling thereof, and an angle of said first casing is alterable both frontwards and rearwards at a part thereof coupled by said second coupling means, with respect to an angle thereof at which said first casing is even with said third casing.

4. A video telephone equipment as defined in claim 3, further comprising:

a hood which intercepts external light entering said display panel; and hood fastening engagement means for engageably fastening said hood with both sides of said second casing.

5. A video telephone equipment as defined in claim 4, wherein said hood fastening engagement means fastens said hood in engagement in a state in which it is openably shut.

6. A video telephone equipment as defined in claim 5, wherein said hood is configured to cover, in its closed position, said speaker and has a through hole extending between front and rear surfaces thereof in an area which covers said speaker.

7. A video telephone equipment comprising:

signal processing means for permitting at least either of a vocal communication and a visual communication;

a speaker which emits received speech for the vocal communication;

a microphone which accepts speech to-be-transmitted for said vocal communication;

a display panel which displays a received picture for the visual communication;

a camera which takes a picture to-be-transmitted for said visual communication;

a control panel through which a user of said video telephone equipment gives an operation command to said signal processing means;

a first casing in which said microphone and said display panel are arranged, and to which said camera is mounted at a lower end thereof so as to have an alterable angle between said camera and said first casing;

a second casing in which said speaker is encased; and coupling means for coupling the first and second casings in a state in which angles thereof are alterable; and camera holding means for holding said camera adjacent to said first casing.

8. A video telephone equipment as defined in claim 7, wherein said camera holding means holds said camera at coupled parts of said first and second casings.

9. A video telephone equipment as defined in claim 8, wherein said camera holding means includes angle keeping means for bringing an optical axis of said camera into a direction of an angle of $\theta/2$ where $\theta$ denotes an angle which is defined at said coupled parts by said first and second casings.

10. A video telephone equipment as defined in claim 9, wherein when said first and second casings are placed one over the other by altering the coupling angle, their surfaces which confront each other are substantially identical in shape and in area.

11. A video telephone equipment, comprising:

signal processing means for permitting at least either of a vocal communication and a visual communication;

a speaker which emits received speech for the vocal communication;

a microphone which accepts speech to-be-transmitted for said vocal communication;

a display panel which displays a received picture for the visual communication;

a camera which takes a picture to-be-transmitted for said visual communication;

a control panel through which a user of said video telephone equipment gives an operation command to said signal processing means;

a first casing in which said microphone and said display panel are arranged, and to which said camera is mounted at a lower end thereof so as to have an alterable angle between said camera and said first casing;

a second casing in which said speaker is encased; and coupling means for coupling the first and second casings in a state in which angles thereof are alterable and in which said first casing is slidable perpendicularly to an axial direction of the coupling.

12. A video telephone equipment as defined in claim 11, wherein the angle of said first casing is alterable both frontwards and rearwards with respect to the angle thereof at which said first casing is even with said second casing.

* * * * *